(12) United States Patent
Yamagishi

(10) Patent No.: US 10,432,989 B2
(45) Date of Patent: Oct. 1, 2019

(54) TRANSMISSION APPARATUS, TRANSMISSION METHOD, RECEPTION APPARATUS, RECEIVING METHOD, AND PROGRAM

(71) Applicant: Saturn Licensing LLC, New York, NY (US)

(72) Inventor: Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 15/127,462

(22) PCT Filed: Mar. 13, 2015

(86) PCT No.: PCT/JP2015/057533
§ 371 (c)(1),
(2) Date: Sep. 20, 2016

(87) PCT Pub. No.: WO2015/146647
PCT Pub. Date: Oct. 1, 2015

(65) Prior Publication Data
US 2017/0134773 A1   May 11, 2017

(30) Foreign Application Priority Data

Mar. 28, 2014   (JP) ................ 2014-069940

(51) Int. Cl.
*H04N 7/173*        (2011.01)
*H04N 21/236*       (2011.01)
(Continued)

(52) U.S. Cl.
CPC ..... *H04N 21/23605* (2013.01); *H04N 21/234* (2013.01); *H04N 21/2353* (2013.01);
(Continued)

(58) Field of Classification Search
CPC ............. H04N 21/643; H04N 21/2353; H04N 21/4305; H04N 21/242; H04N 21/234; H04N 21/23605
See application file for complete search history.

(56) References Cited

U.S. PATENT DOCUMENTS

| 2009/0177942 A1 | 7/2009 | Hannuksela et al. |
| 2011/0239078 A1* | 9/2011 | Luby ................ H04N 21/23106 714/752 |

(Continued)

FOREIGN PATENT DOCUMENTS

| CN | 103283251 A | 9/2013 |
| CN | 103518351 A | 1/2014 |

(Continued)

OTHER PUBLICATIONS

Mitsuhiro Hirabayashi, "Realizing the Uninterrupted Video Distribution in the Existing Web Server", pp. 77-85.

(Continued)

*Primary Examiner* — Nasser M Goodarzi
*Assistant Examiner* — Patrick A Ryan
(74) *Attorney, Agent, or Firm* — Oblon, McClelland, Maier & Neustadt, L.L.P.

(57) ABSTRACT

The present technology relates to a transmission apparatus, a transmission method, a reception apparatus, a receiving method, and a program that enable prompt data delivery. An LCT packet including a portion which is data including part of a fragment; and an LCT header is delivered. The fragment includes a moof and an mdat including an mdat header and a sample group. The moof includes BaseMediaDecodeTime representing a presentation time of a first sample of the mdat. The LCT header includes a sequence number representing a position of the fragment; a version representing a position of the part of the fragment in the fragment; an NTP time corresponding to the BaseMediaDecodeTime; sample (Continued)

count start information representing a position of a first sample of the part of the fragment from a first sample of the fragment; and a moof subset that is at least part of the moof. The present technology can be applied to, for example, a case of multicast-delivering content.

19 Claims, 31 Drawing Sheets

(51) Int. Cl.
| | |
|---|---|
| H04N 21/242 | (2011.01) |
| H04N 21/43 | (2011.01) |
| H04N 21/234 | (2011.01) |
| H04N 21/235 | (2011.01) |
| H04N 21/643 | (2011.01) |

(52) U.S. Cl.
CPC ....... *H04N 21/242* (2013.01); *H04N 21/4305* (2013.01); *H04N 21/643* (2013.01)

(56) References Cited

U.S. PATENT DOCUMENTS

| | | | |
|---|---|---|---|
| 2013/0191860 A1 | 7/2013 | Kitazato et al. | |
| 2014/0150014 A1* | 5/2014 | Aitken | H04N 21/2381 725/33 |
| 2014/0195651 A1* | 7/2014 | Stockhammer | H04N 21/23439 709/219 |
| 2016/0227263 A1* | 8/2016 | Lee | H04N 21/236 |

FOREIGN PATENT DOCUMENTS

| | | |
|---|---|---|
| EP | 3 065 414 A1 | 9/2016 |
| WO | 2013/107502 A | 7/2013 |
| WO | 2013/107502 A1 | 7/2013 |
| WO | 2015/064384 A | 5/2015 |
| WO | 2015/064384 A1 | 5/2015 |

OTHER PUBLICATIONS

"Details of the New Transport Protocol", Samsung Telecommunications, Dec. 16, 2013, pp. 9.

Samsung Telecommunications, "Details of the New Transport Protocol", TSG SA4 MBS Telco, Dec. 16, 2013, pp. 9, S4-AHI428.

Mitsuhiro Hirabayashi, "Realizing the Uninterrupted Video Distribution in the Existing Web Server", An Exposition on "MPEG-DASH", the Next-Generation Standard of Video Distribution, Invited Paper, Nikkei Electronics, Mar. 19, 2012, 21 pages including 12 pages of English translation.

Extended European Search Report dated Aug. 9, 2017 in Patent Application No. 15770090.7.

Combined Chinese Office Action and Search Report dated Jan. 2, 2019 in Patent Application No. 201580015015.8 (with English language translation).

* cited by examiner

FIG. 12

```
⎧ HTTP/1.1 206 Partial Content
⎪ Date: Fri, 04 Oct 2013 11:14:19 GMT
100⎨ Content-type: multipart/byteranges; boundary=SEPARATER_STRING
⎪ X-MoofSeqNumVersion: sqn=1, v=1 ~101
⎩ X-NTPTimeStamp: 2890844526 ~102

--SEPARATER_STRING                                              ⎫
  Content-type: application/mp4                                   ⎬ 103
  Content-range: bytes 492-499/124567654 (BYTE RANGE OF styp)     ⎭

(…BYTE SEQUENCE OF styp…)
  --SEPARATER_STRING                                              ⎫
  Content-type: application/mp4                                   ⎬ 104
  Content-range: bytes 500-991/124567654 (BYTE RANGE OF moof SUBSET 64) ⎭

(…BYTE SEQUENCE OF moof SUBSET 64…)
  --SEPARATER_STRING                                              ⎫
  Content-type: application/mp4                                   ⎬ 105
  Content-range: bytes 992-999/124567654 (BYTE RANGE OF mdat HEADER 55) ⎭

(…BYTE SEQUENCE OF mdat HEADER 55…)
  --SEPARATER_STRING                                              ⎫
  Content-type: application/mp4                                   ⎬ 106
  Content-range: bytes 1000-4999/124567654 (BYTE RANGE OF SAMPLE GROUP 56) ⎭

(…BYTE RANGE OF SAMPLE GROUP 56…)
  --SEPARATER_STRING-- ~107
```

FIG. 13

```
HTTP/1.1 206 Partial Content
Date: Fri, 04 Oct 2013 11:14:20 GMT
Content-type: multipart/byteranges; boundary=SEPARATER_STRING
X-MoofSeqNumVersion: sqn=1, v=2  ~121
X-NTPTimeStamp: 2890844526  ~122
X-SampleCountStart: n1  ~123
```
120 { (lines above)

```
--SEPARATER_STRING
Content-type: application/mp4
Content-range: bytes 500-991/124567654 (BYTE RANGE OF moof SUBSET 73)
```
} 124

```
(…BYTE SEQUENCE OF moof SUBSET 73…)
--SEPARATER_STRING
Content-type: application/mp4
Content-range: bytes 5000-7999/124567654 (BYTE RANGE OF SAMPLE GROUP 57)

(…BYTE SEQUENCE OF SAMPLE GROUP 57…)
--SEPARATER_STRING--  ~126
```
} 125

FIG. 21

| FIELD | SIZE (bit) | VALUE |
|---|---|---|
| HET | 8 | 120, HEADER TYPE |
| HEL | 8 | INTEGER VALUE OF 0 TO 255 (CALLED HELN) AND HEADER EXTENSION LENGTH (32bit*HELN) |
| Filtering Scheme URI | 8 | SchemeURI THAT IDENTIFIES SUBSEQUENT FILTERING PARAMETER STRUCTURE. |
| Filtering Parameter Length | 8 | INTEGER VALUE OF 0 TO 255 (CALLED FPLN) AND Filtering Parameter LENGTH (8bit*FPLN) |
| Filtering Parameter | 8*FPLN | CONTENT OF Filtering Parameter. STRUCTURE IS IDENTIFIED BY Filtering Scheme URI. |

FIG. 22

| FIELD | SIZE (bit) | VALUE |
|---|---|---|
| Track Reference Index | 8 | INTEGER VALUE OF 0 TO 255 THAT IDENTIFIES MEDIA TRACK. |
| Priority | 8 | INDEX FOR RANKING PROCESSING PRIORITY IN 0 TO 255 IN ONE FILE UNIT (SAME TOI) (LARGER THE VALUE, LOWER THE PRIORITY). |
| Dependency Counter | 8 | VALUE INDICATING HOW MANY SUBSEQUENT LCT PACKETS DEPEND ON PROCESSES FOR THIS LCT PACKET. WHEN VALUE IS N, IT INDICATES THAT N SUBSEQUENT CONSECUTIVE LCT PACKETS DEPEND ON PROCESSES FOR THIS LCT PACKET. |
| MVC Filter Length | 8 | Boolean VALUE, AND WHEN True, IT INDICATES THAT THERE IS MVC Filter. |
| MVC Filter | 32 | STRUCTURE THAT STORES PARAMETERS FOR IMPLEMENTING FILTERING BY PARAMETERS RELATED TO MVC (Multi View Coding). |

FIG. 23

| PRID(6bits) | TID(3bits) | VID(10bits) | Reserved(13bits) |

PRID: 6 bits
priority_id. This flag specifies a priority identifier for the NAL unit. A lower value of PRID indicates a higher priority.

TID: 3 bits
temporal_id. This component specifies the temporal layer (or frame rate) hierarchy. Informally put, a temporal layer consisting of view component with a less temporal_id corresponds to a lower frame rate. A given temporal layer typically depends on the lower temporal layers (i.e. the temporal layers with less temporal_id values) but never depends on any higher temporal layer (i.e. a temporal layers with higher temporal_id value).

VID: 10 bits
view_id. This component specifies the view identifier of the view the NAL unit belongs to.

Reserved: 13bits

FIG. 26

| FIELD | SIZE (bit) | VALUE |
|---|---|---|
| HET | 8 | 101, HEADER TYPE |
| HEL | 8 | INTEGER VALUE OF 0 TO 255 (CALLED HELN) AND HEADER EXTENSION LENGTH (32bit*HELN) |
| NTPTimeStamp | 64 | NTP Time Stamp CORRESPONDING TO BaseMediaDecodeTime IN Moof |
| MoofSequenceNumber | 16 | VALUE OF sequence_number IN Moof |
| MoofVersion | 16 | VERSION OF DIVIDED moof |
| SampleCountStart | 16 | VALUE OF Sample Count Start |
| Partial moof Length | 8 | INTEGER VALUE OF 10 TO 255 (CALLED PMLN) AND Partial moof LENGTH (8bit*PMLN) |
| Partial moof | 8*PMLN | CONTENT OF Partial moof. STRUCTURE IS BINARY FORMAT OF moof ITSELF. |

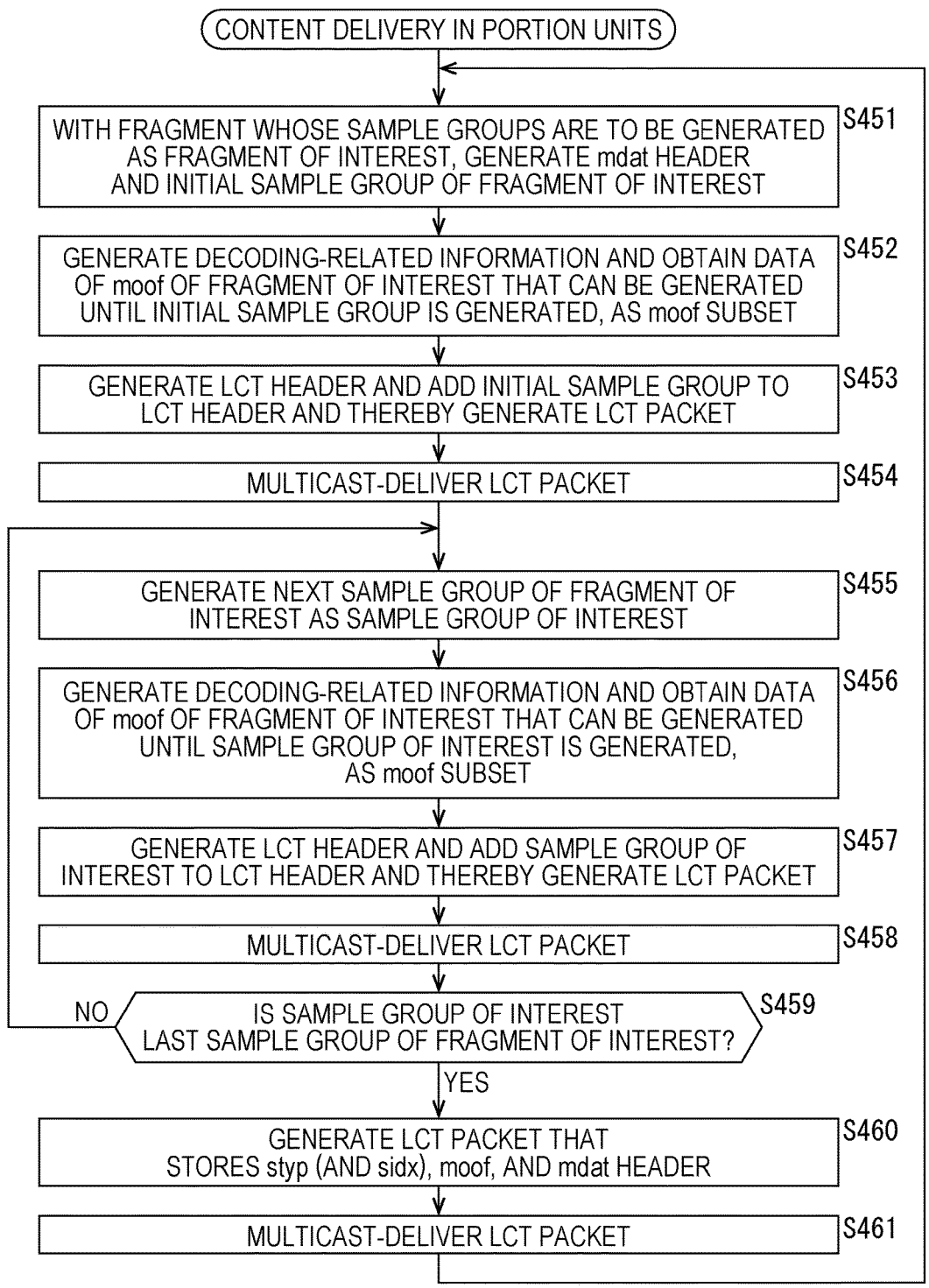

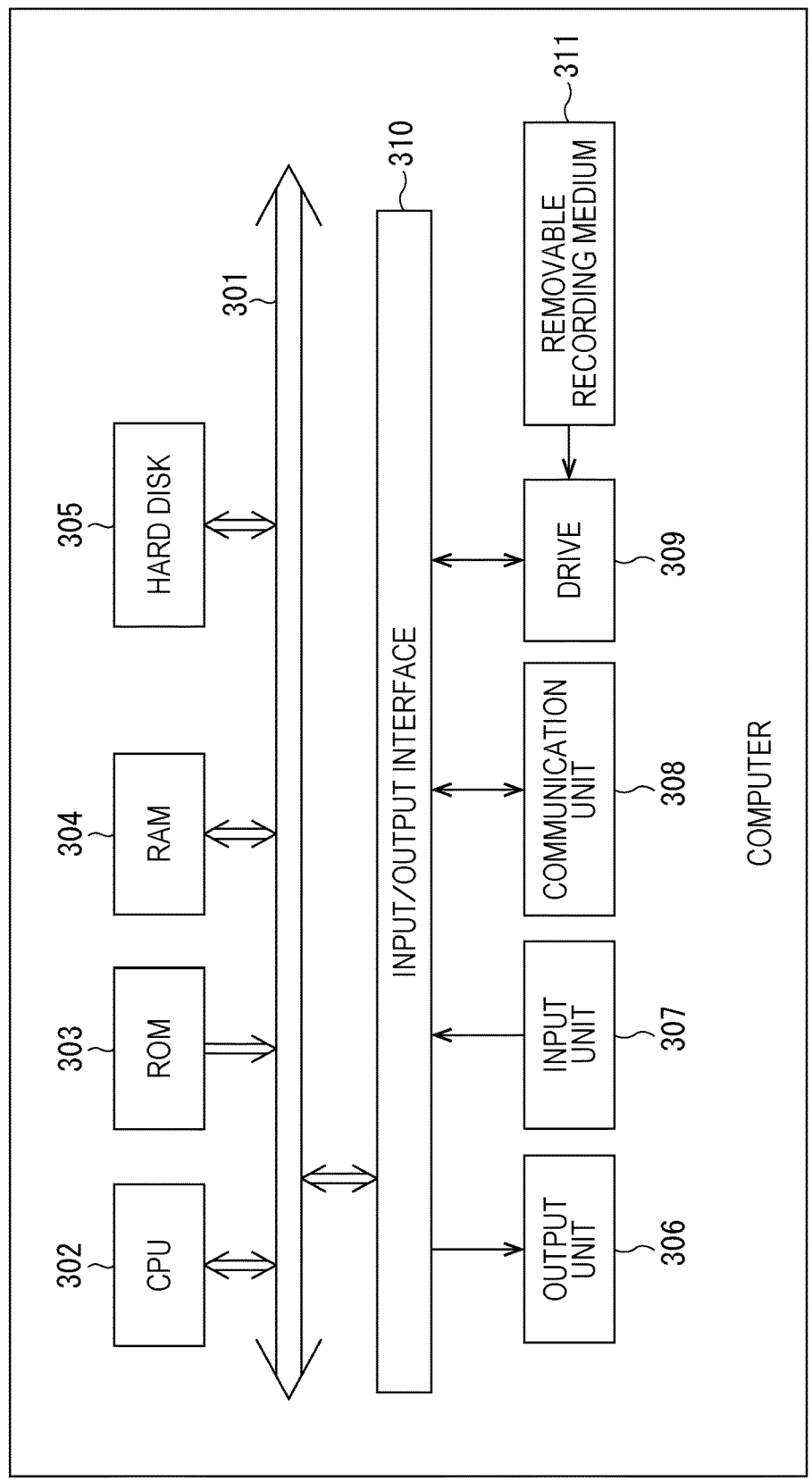

TRANSMISSION APPARATUS, TRANSMISSION METHOD, RECEPTION APPARATUS, RECEIVING METHOD, AND PROGRAM

CROSS REFERENCE TO RELATED APPLICATIONS

This application is a U.S. National Phase of International Patent Application No. PCT/JP2015/057533 filed on Mar. 13, 2015, which claims priority benefit of Japanese Patent Application No. 2014-069940 filed in the Japan Patent Office on Mar. 28, 2014. Each of the above-referenced applications is hereby incorporated herein by reference in its entirety.

TECHNICAL FIELD

The present technology relates to a transmission apparatus, a transmission method, a reception apparatus, a receiving method, and a program, and more particularly to a transmission apparatus, a transmission method, a reception apparatus, a receiving method, and a program that, for example, enable prompt data delivery.

BACKGROUND ART

In recent years, Over The Top Video (OTT-V) has become the mainstream of streaming services on the Internet. For example, Moving Picture Experts Group-Dynamic Adaptive Streaming over Hypertext Transfer Protocol (HTTP) (MPEG-DASH) (hereinafter, also referred to as DASH) has started to spread as the basic technology of OTT-V.

In DASH, for example, Media Presentation Description (MPD) serving as metadata that includes attribute information for optimally selecting streams with different characteristics from the same source is notified to a client that receives streams by a server that delivers streams, and the client uses the MPD, by which network environment adaptive streaming is implemented (see, for example, Non-Patent Document 1).

Specifically, in DASH, a server prepares a plurality of streams with different image qualities, different image sizes, etc., as being of the same content, according to a delivery path communication environment, client's capabilities or state, etc.

On the other hand, a client adaptively selects a stream that can be received by the client and that is suited for client's capabilities (decoding capability, etc.) among the plurality of streams prepared by the server, and receives and reproduces the stream.

In DASH, in order that the client can adaptively select and receive a stream, metadata which is called MPD and used for content reproduction control is delivered to the client from the server.

The MPD describes, for example, a Uniform Resource Locator (URL) serving as an address of a segment (media data such as Audio/Video/Subtitle) into which content is divided. The client transmits an http request to a (web) server serving as a content delivery source, on the basis of the URL, etc., described in the MPD, and receives and reproduces a segment that is unicast-delivered by the server in response to the http request.

CITATION LIST

Non-Patent Document

Non-Patent Document 1: "Achieving Uninterrupted Video Streaming Using Existing Web Servers", Mitsuhiro Hirabayashi, NIKKEI ELECTRONICS 2012 Mar. 19

SUMMARY

Problems to be Solved

Content delivery by DASH is implemented by point-to-point http streaming. Thus, when the content delivery by DASH is applied to, for example, streaming of content (program) that is possibly viewed by an extremely large number of users at the same time, such as sports live broadcast, the content delivery by DASH needs to use (be supported by) Akamai's Contents Delivery Network (CDN) and the like.

However, even if the CDN is used, it is difficult to get scalability comparable to existing broadcast delivery due to cost constraints of the CDN.

DASH is based on a streaming protocol that uses http. For content, etc., that are viewed by a large number of users at the same time, it is desirable to reduce network resource load by performing broadcast delivery by using DASH with, for example, a multicast or broadcast (MC/BC) bearer such as Real-time Transport Protocol (RTP) or File Delivery over Unidirectional Transport (FLUTE).

Meanwhile, in the current DASH, segment (files) into which a content stream is divided are used as DASH file delivery units (control objects), and the files are delivered in segment units.

Therefore, in the current DASH, when content is multi-cast-delivered (including broadcast delivery), content delivery needs to wait until a segment is generated.

It is expected in the future that delivery of moving images with higher image quality will become common. In such delivery of moving images with high image quality, the bit rate of content streams increases.

If, when the bit rate of content streams is high, content delivery, i.e., a bulk transfer, is performed in segment units after waiting for generation of a segment to be completed, then network bandwidth may be excessively used and accordingly shaping may be required.

Therefore, delivering content in segment units after waiting for generation of a segment to be completed ends up with delay in content reception and start of buffering by a client. Hence, it is expected that technologies for prompt content delivery are proposed.

The present technology has been conceived in view of such circumstances, and it aims to enable prompt delivery of data such as content.

Solutions to Problems

A transmission apparatus or a first program of the present technology is a transmission apparatus or a program for causing a computer to function as such a transmission apparatus, the transmission apparatus including a delivering unit that delivers a Layered Coding Transport (LCT) packet including a portion and an LCT header, the portion being data including part of a fragment, wherein the fragment includes: a movie fragment (moof); and a media data (mdat) including an mdat header and one or more sample groups, the moof includes BaseMediaDecodeTime representing a presentation time of a first sample of the mdat, and the LCT header includes: a sequence number representing a position of the fragment; a version representing a position of the part of the fragment in the fragment; a Network Time Protocol (NTP) time corresponding to the BaseMediaDecodeTime; sample count start information representing a position of a first sample of the part of the fragment from a first sample of the fragment; and a moof subset that is at least part of the moof.

A transmission method of the present technology includes a step of delivering a Layered Coding Transport (LCT) packet including a portion and an LCT header, the portion being data including part of a fragment, and the fragment includes: a movie fragment (moof); and a media data (mdat) including an mdat header and a sample group, the moof includes BaseMediaDecodeTime representing a presentation time of a first sample of the mdat, and the LCT header includes: a sequence number representing a position of the fragment; a version representing a position of the part of the fragment in the fragment; a Network Time Protocol (NTP) time corresponding to the BaseMediaDecodeTime; sample count start information representing a position of a first sample of the part of the fragment from a first sample of the fragment; and a moof subset that is at least part of the moof.

In the transmission apparatus, transmission method, and first program such as those described above, an LCT packet including a portion that is data including part of a fragment; and a Layered Coding Transport (LCT) header is delivered. The fragment includes: a movie fragment (moof); and a media data (mdat) including an mdat header and a sample group, the moof includes BaseMediaDecodeTime representing a presentation time of a first sample of the mdat, and the LCT header includes: a sequence number representing a position of the fragment; a version representing a position of the part of the fragment in the fragment; a Network Time Protocol (NTP) time corresponding to the BaseMediaDecodeTime; sample count start information representing a position of a first sample of the part of the fragment from a first sample of the fragment; and a moof subset that is at least part of the moof.

A reception apparatus or a second program of the present technology is a reception apparatus or a program for causing a computer to function as such a reception apparatus, the reception apparatus including a receiving unit that receives a Layered Coding Transport (LCT) packet including a portion and an LCT header, the portion being data including part of a fragment, wherein the fragment includes: a movie fragment (moof); and a media data (mdat) including an mdat header and a sample group, the moof includes BaseMediaDecodeTime representing a presentation time of a first sample of the mdat, and the LCT header includes: a sequence number representing a position of the fragment; a version representing a position of the part of the fragment in the fragment; a Network Time Protocol (NTP) time corresponding to the BaseMediaDecodeTime; sample count start information representing a position of a first sample of the part of the fragment from a first sample of the fragment; and a moof subset that is at least part of the moof.

A receiving method of the present technology includes a step of receiving a Layered Coding Transport (LCT) packet including a portion and an LCT header, the portion being data including part of a fragment, and the fragment includes: a movie fragment (moof); and a media data (mdat) including an mdat header and a sample group, the moof includes BaseMediaDecodeTime representing a presentation time of a first sample of the mdat, and the LCT header includes: a sequence number representing a position of the fragment; a version representing a position of the part of the fragment in the fragment; a Network Time Protocol (NTP) time corresponding to the BaseMediaDecodeTime; sample count start information representing a position of a first sample of the part of the fragment from a first sample of the fragment; and a moof subset that is at least part of the moof.

In the reception apparatus, receiving method, and second program such as those described above, an LCT packet including a portion that is data including part of a fragment; and a Layered Coding Transport (LCT) header is received. The fragment includes: a movie fragment (moof); and a media data (mdat) including an mdat header and a sample group, the moof includes BaseMediaDecodeTime representing a presentation time of a first sample of the mdat, and the LCT header includes: a sequence number representing a position of the fragment; a version representing a position of the part of the fragment in the fragment; a Network Time Protocol (NTP) time corresponding to the BaseMediaDecodeTime; sample count start information representing a position of a first sample of the part of the fragment from a first sample of the fragment; and a moof subset that is at least part of the moof.

Note that the transmission apparatus and the reception apparatus may be independent apparatuses or may be an internal block forming one apparatus.

Effects

According to the present technology, for example, data can be promptly delivered.

Note that the effect described here is not necessarily limited, and an effect may be any of those described in the present disclosure.

BRIEF DESCRIPTION OF DRAWINGS

FIG. 12 is a diagram showing an example of an http response serving as a portion 60.

FIG. 13 is a diagram showing an example of an http response serving as a portion 70.

FIG. 21 is a diagram showing an example of definitions of new Header Extensions that store priority parameters.

FIG. 22 is a diagram showing an example of definitions of priority parameters (Filtering Parameter).

FIG. 23 is a diagram showing an example of definitions of an MVC Filter.

FIG. 26 is a diagram showing an example of definitions of new Header Extensions of an LCT header that store decoding-related information.

FIG. 31 is a flowchart describing an example of processes for content delivery in portion units by use of LCT packets of the second example.

FIG. 32 is a block diagram showing an exemplary configuration of one embodiment of a computer to which the present technology is applied.

DESCRIPTION OF PREFERRED EMBODIMENTS

<One Embodiment of a Content Providing System to which the Present Technology is Applied>

Figure 1:
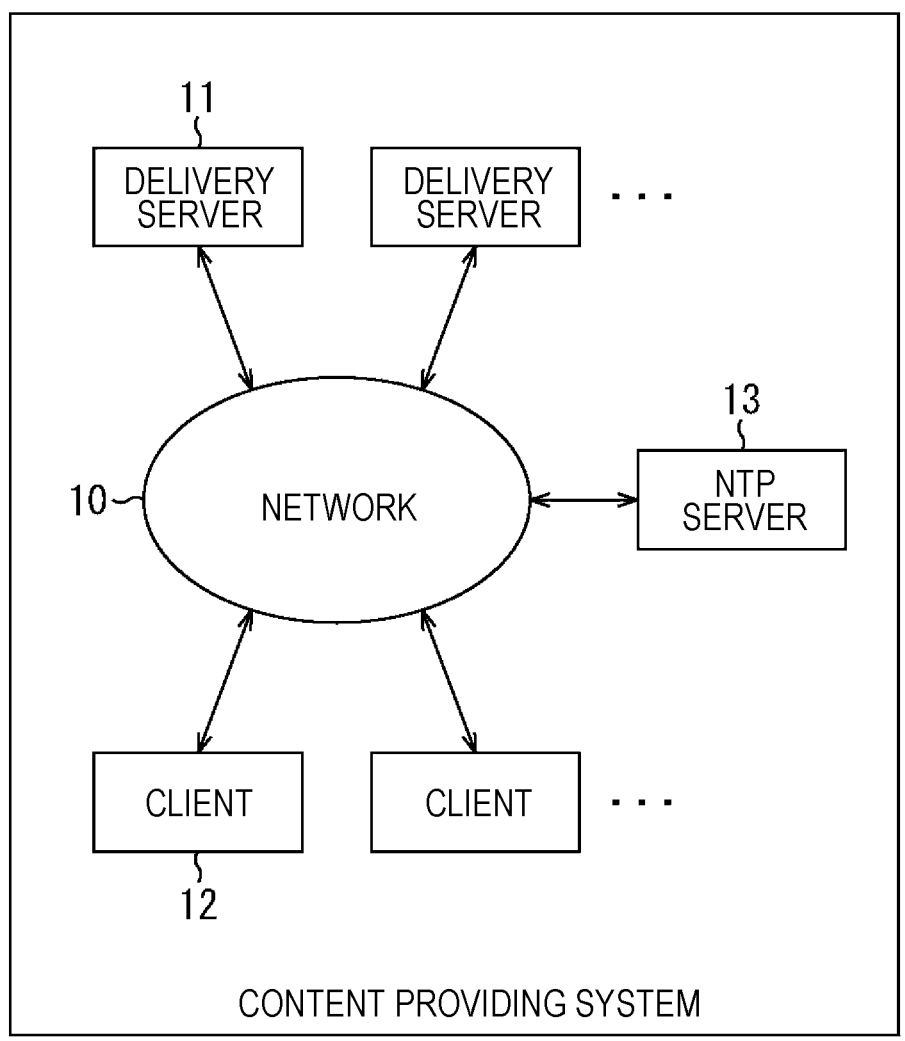
FIG. 1 is a block diagram showing an exemplary configuration of one embodiment of a content providing system to which the present technology is applied.

FIG. 1 is a block diagram showing an exemplary configuration of one embodiment of a content providing system to which the present technology is applied.

In FIG. 1, a content providing system is configured such that one or more delivery servers 11, one or more clients 12, and a Network Time Protocol (NTP) server 13 are connected to a network 10.

In the content providing system of FIG. 1, content is provided to the clients 12 from the delivery servers 11 through the network 10, using DASH.

Here, although in the current DASH it is presumed that streaming itself is performed by unicast on an Over The Top/Contents Delivery Network (OTT/CDN), the content providing system of FIG. 1 not only unicast-delivers content, but also, for example, multicast-delivers content on a quality guaranteed broadcastable multicast network (eM-BMS, etc.) on a cellular network.

The network 10 includes a unicastable and multicastable two-way network such as the Internet; and a broadcastable and multicastable broadcasting system network. For the network 10, for example, 3rd Generation Partnership Project (3GPP) Multimedia Broadcast Multicast Service (MBMS) (including Evolved MBMS (eMBMS)), etc., can be adopted.

The delivery server 11 corresponds, for example, to a broadcasting station, and delivers a plurality of streams which are streams of content of the same material and which have different bit rates, different image sizes, etc., as a program of a channel (service) of the broadcasting station, through the network 10.

The client 12 receives (a stream of) content delivered by the delivery server 11, through the network 10 and reproduces the content.

The NTP server 13 provides an NTP time which is time information conforming to Coordinated Universal Time (UTC) time format, through the network 10.

The delivery server 11 and the client 12 can operate in synchronization with the NTP time provided from the NTP server 13.

Note that programs to be delivered by the delivery server 11 may be real-time programs (live programs) or may be pre-recorded programs.

<Exemplary Configuration of the Delivery Server 11>

Figure 2:
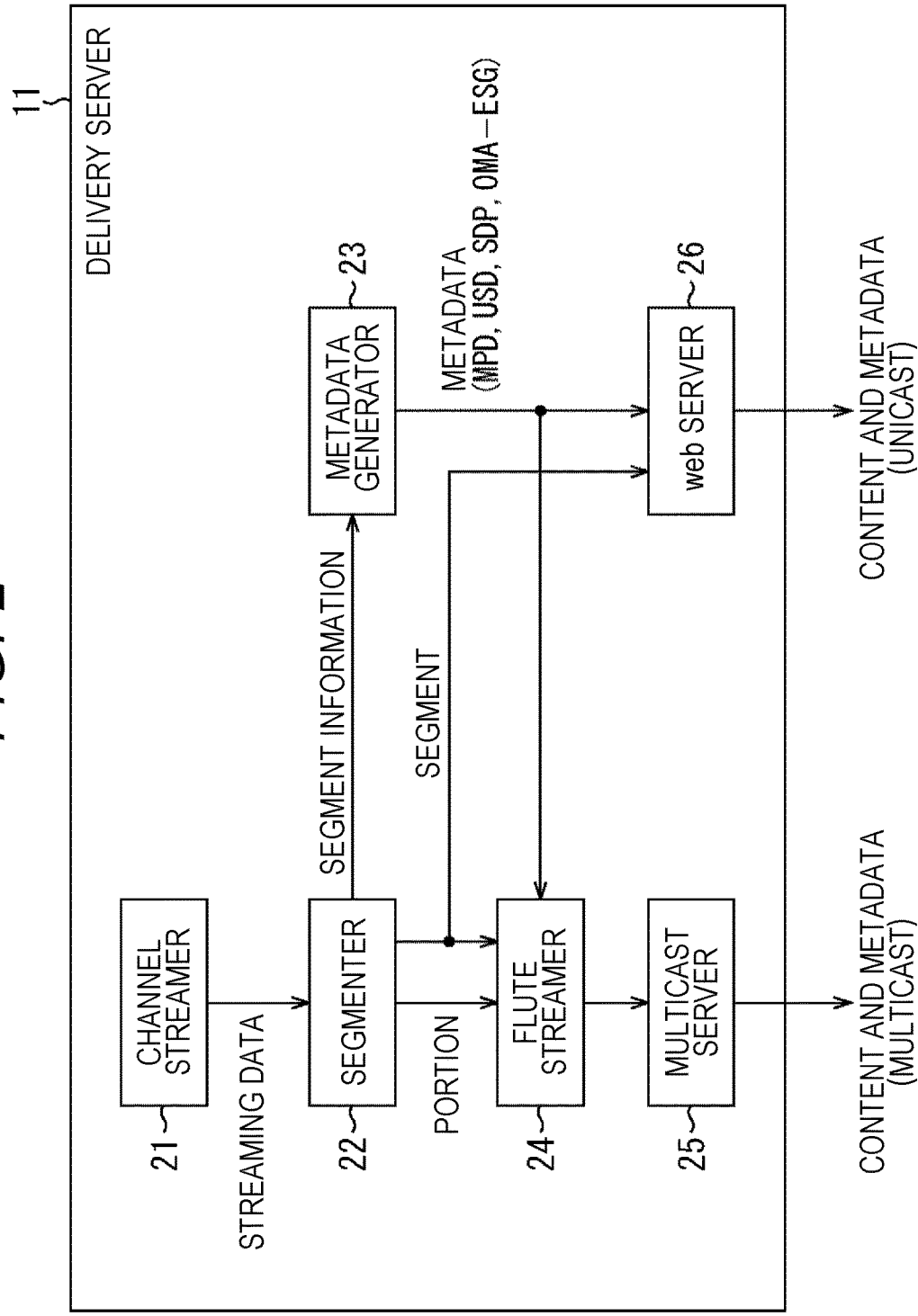
FIG. 2 is a block diagram showing an exemplary configuration of a delivery server 11.

FIG. 2 is a block diagram showing an exemplary configuration of the delivery server 11 of FIG. 1.

In FIG. 2, the delivery server 11 includes a channel streamer 21, a segmenter 22, a metadata generator 23, a File Delivery over Unidirectional Transport (FLUTE) streamer 24, a multicast server 25, and a web server 26.

Here, the channel streamer 21 to the web server 26 can be disposed in one location on the network 10 or can be disposed on the network 10 in a distributed manner. When the channel streamer 21 to the web server 26 are disposed on the network 10 in a distributed manner, mutual communication can be performed not only through the network 10, but also through a dedicated line or any other communication line.

The channel streamer 21 manages video, audio, subtitles, etc., which serve as source data of content to be delivered as a program of a channel of the delivery server 11, and generates a plurality of pieces of streaming data with different bit rates from the video, etc., which serve as the source data of the content, and supplies the plurality of pieces of streaming data to the segmenter 22.

The segmenter 22 creates segment files into which each piece of streaming data from the channel streamer 21 is divided in a time direction, and supplies the segment files to the FLUTE streamer 24 and the web server 26.

Specifically, the segmenter 22 divides streaming data and thereby generates, for example, fragmented MP4 fragments (a moof and an mdat), and collects one or more of the fragments to create a segment file.

In addition, the segmenter 22 supplies to the metadata generator 23 related information that is related to a segment and required for generation of MPD, such as a URL of the segment (a URL of a server that provides the segment (e.g., the delivery server 11)) and a segment range (information indicating a range, in content, of video, etc., included in the segment).

Here, instead of a segment where fragments are collected, the segmenter 22 can generate, during generation of fragments, a portion (described later) which is constituted by part of a fragment, and supply the portion to the FLUTE streamer 24, instead of a segment.

The metadata generator 23 generates, for example, a combination of MBMS User Service Description (USD), DASH MPD, and Internet Engineering Task Force (IETF) Session Description Protocol (SDP) (files), or a combination where Open Mobile Alliance-Electronic Service Guide (OMA-ESG) is added to the USD, MPD, and SDP, as content metadata required, for example, for reception of the segment by the client 12, using the related information of the segment supplied from the segmenter 22, etc.

Namely, the metadata generator 23 generates, using the related information of the segment supplied from the segmenter 22, MPD that describes a URL of the segment, etc., and that is required by the client 12 to perform reception and reproduction control of the segment.

Furthermore, the metadata generator 23 generates USD and SDP, or USD, SDP, and OMA-ESG, as announcement information announcing that the content is multicast-delivered (including broadcast delivery).

The metadata generator 23 supplies the metadata to the FLUTE streamer 24 and the web server 26.

The FLUTE streamer 24 stores (a segment or portion of) the content supplied from the segmenter 22 in a FLUTE packet, i.e., a Layered Coding Transport (LCT) packet (in the present embodiment, the LCT packet refers to a packet having an LCT header, and includes an Asynchronous Layered Coding (ALC) packet), and supplies the LCT packet to the multicast server 25.

In addition, the FLUTE streamer 24 stores the metadata supplied from the metadata generator 23 in an LCT packet and supplies the LCT packet to the multicast server 25.

The multicast server 25 (FLUTE-)multicast-delivers the LCT packets supplied from the FLUTE streamer 24, through the network 10.

Here, since the LCT packets supplied from the FLUTE streamer 24 store, as described above, (the segment or portion of) the content and the metadata, the multicast server 25 multicast-delivers the content and the metadata.

In response to a request (http request) from the client 12, the web server 26 (http-)unicast-delivers the metadata supplied from the metadata generator 23 or (the segment of) the content supplied from the segmenter 22, to the client 12 through the network 10.

As described above, the multicast server 25 and the web server 26 function as a delivering unit that delivers content and metadata.

Note that although in FIG. 2 the web server 26 unicast-delivers a segment of content, as with the multicast server 25, the web server 26 can unicast-deliver a portion instead of a segment of content.

<Exemplary Configuration of the Client 12>

Figure 3:
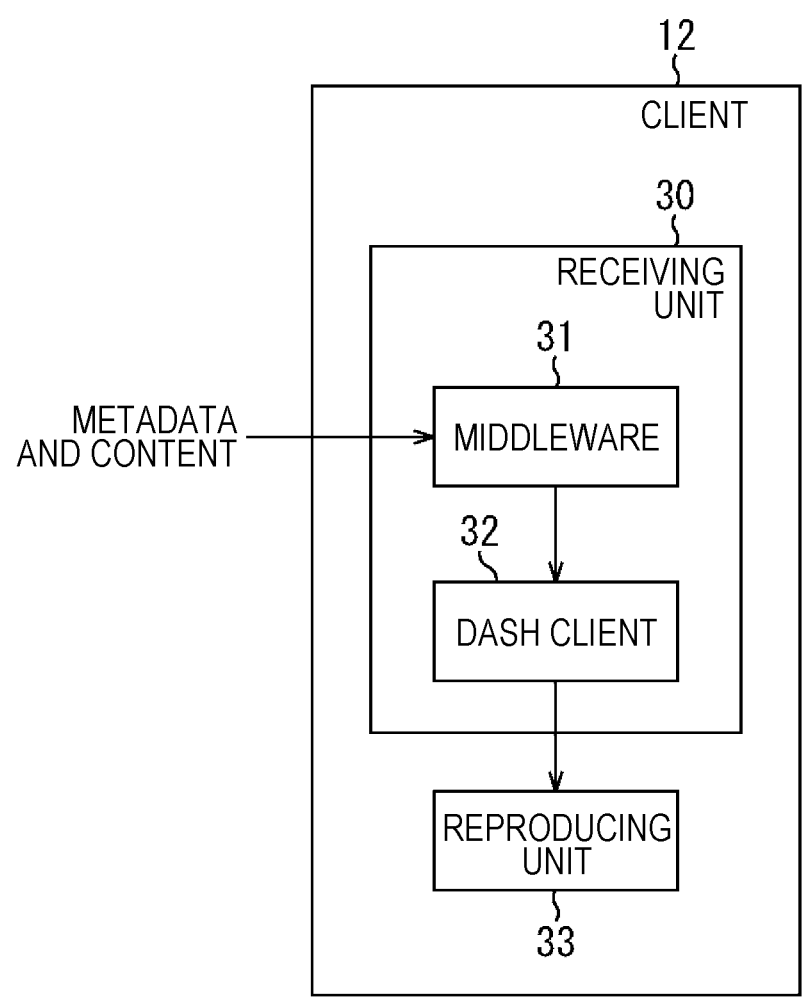
FIG. 3 is a block diagram showing an exemplary configuration of a client 12.

FIG. 3 is a block diagram showing an exemplary configuration of the client 12 of FIG. 1.

In FIG. 3, the client 12 includes a receiving unit 30 and a reproducing unit 33.

The receiving unit 30 functions as a receiving unit that, for example, receives content and metadata delivered from the delivery server 11 in response to user's operations on the client 12, etc.

Specifically, the receiving unit 30 receives metadata delivered from the delivery server 11. Furthermore, the receiving unit 30, for example, receives (a segment or portion of) content delivered from the delivery server 11 in response to a user's operation on the client 12, etc., and on the basis of the metadata received from the delivery server 11.

Then, the receiving unit 30 supplies the content received from the delivery server 11 to the reproducing unit 33, and controls the reproduction of the content by the reproducing unit 33, on the basis of the metadata received from the delivery server 11.

The reproducing unit 33 reproduces video, audio, subtitles, etc., which serve as the content supplied from the receiving unit 30, according to the control by the receiving unit 30.

Here, the receiving unit 30 includes middleware 31 and a DASH client 32.

The DASH client 32 outputs an http request that requests MPD or an http request that requests a segment of content, to the middleware 31 as necessary.

The middleware 31 receives, as necessary, (a segment or portion of) content and metadata which are multicast-delivered from the delivery server 11. When the DASH client 32 outputs an http request, the middleware 31 determines, on the basis of the metadata, whether MPD or a segment requested by the http request is multicast-delivered.

Then, when MPD or a segment requested by the http request which is outputted from the DASH client 32 is multicast-delivered, the middleware 31 receives the MPD or segment (or a portion including a part of the segment) which is multicast-delivered, and supplies the MPD or segment to the DASH client 32.

Note that when MPD or a segment requested by the http request which is outputted from the DASH client 32 is already received, the middleware 31 supplies the already received MPD or segment to the DASH client 32.

On the other hand, when MPD or a segment requested by the http request which is outputted from the DASH client 32 is not multicast-delivered, the middleware 31 transmits the http request outputted from the DASH client 32, as it is to (the delivery server 11 on) the network 10. Then, the middleware 31 receives MPD or a segment which is unicast-delivered (from the delivery server 11) in response to the http request, and supplies the MPD or segment to the DASH client 32.

Therefore, as with a common DASH client, the DASH client 32 outputs an http request that requests a required MPD or segment, and receives and processes MPD or segment supplied from the middleware 31 in response to the http request.

<Processes of the Content Providing System>

Figure 4:
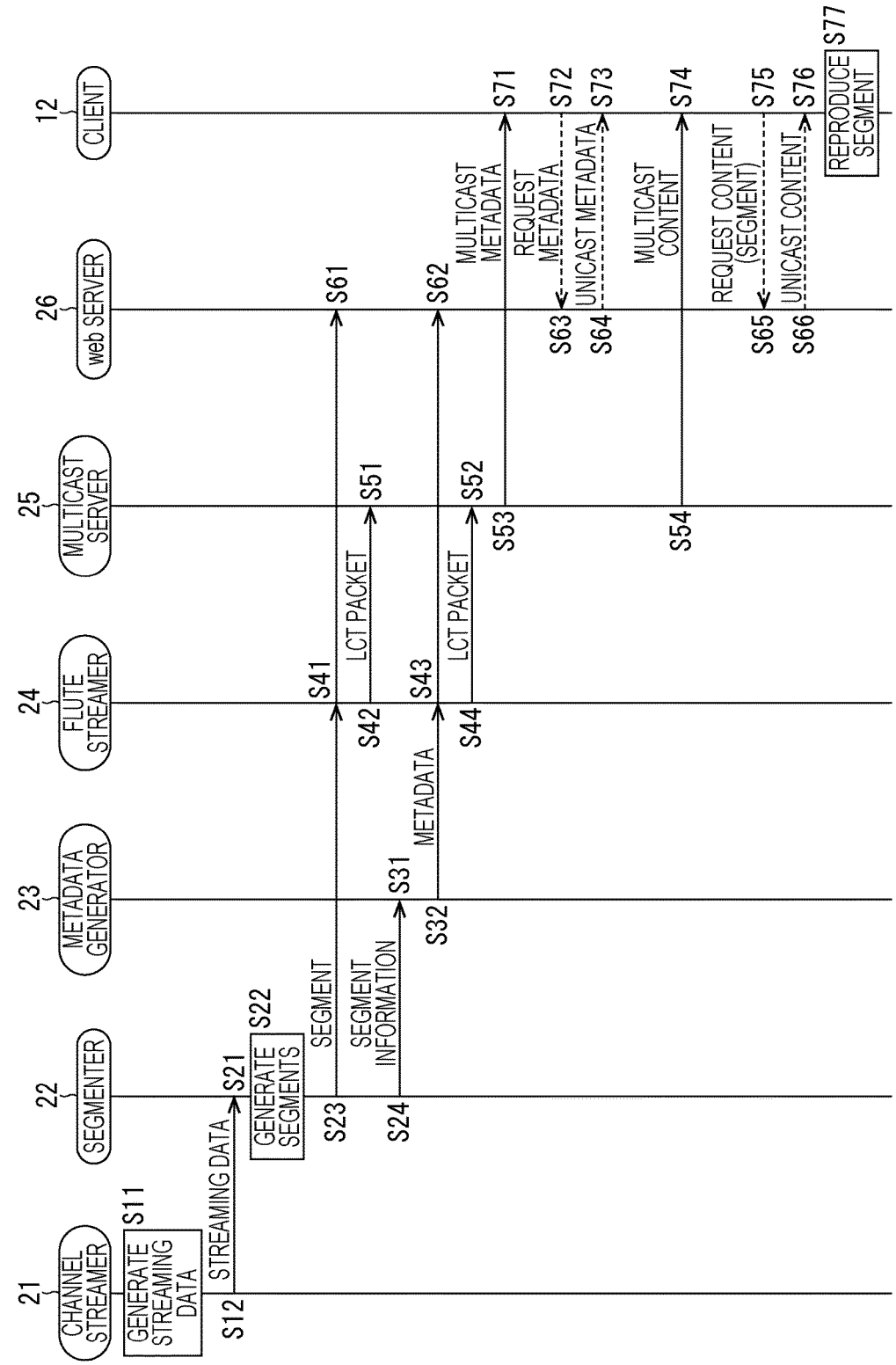
FIG. 4 is a diagram describing an example of processes for provision of content by the content providing system.

FIG. 4 is a diagram describing an example of processes for provision of content by the content providing system of FIG. 1.

At step S11, the channel streamer 21 (FIG. 2) generates a plurality of pieces of streaming data with different bit rates from video, etc., serving as source data of content to be delivered as a program of a channel of the delivery server 11.

Then, at step S12, the channel streamer 21 supplies the plurality of pieces of streaming data of the content with different bit rates to the segmenter 22.

At step S21, the segmenter 22 (FIG. 2) receives (the plurality of pieces of streaming data of) the content supplied from the channel streamer 21.

At step S22, the segmenter 22 generates a segment which is a DASH file delivery unit from the content supplied from the channel streamer 21. At step S23, the segmenter 22 supplies the segment to the FLUTE streamer 24 and the web server 26.

Furthermore, at step S24, the segmenter 22 generates related information of the segment and supplies the related information of the segment to the metadata generator 23.

At step S31, the metadata generator 23 (FIG. 2) receives the related information of the segment supplied from the segmenter 22 at step S24.

Then, at step S32, the metadata generator 23 generates metadata of the content, using the related information from the segmenter 22, etc., and supplies the metadata to the FLUTE streamer 24 and the web server 26.

At step S41, the FLUTE streamer 24 (FIG. 2) receives (the segment of) the content supplied from the segmenter 22 at step S23. At step S42, the FLUTE streamer 24 generates an LCT packet including the content and supplies the LCT packet to the multicast server 25.

Furthermore, at step S43, the FLUTE streamer 24 receives the metadata supplied from the metadata generator 23 at step S32. At step S44, the FLUTE streamer 24 generates an LCT packet including the metadata and supplies the LCT packet to the multicast server 25.

At step S51, the multicast server 25 (FIG. 2) receives the LCT packet including the content and supplied from the FLUTE streamer 24 at step S42. At step S52, the multicast server 25 receives the LCT packet including the metadata.

Then, at step S53, the multicast server 25 multicast-delivers the LCT packet including the metadata and supplied from the FLUTE streamer 24. At step S54, the multicast server 25 multicast-delivers the LCT packet including the content and supplied from the FLUTE streamer 24.

At step S61, the web server 26 (FIG. 2) receives (the segment of) the content supplied from the segmenter 22 at step S23. At step S62, the web server 26 receives the metadata supplied from the metadata generator 23 at step S32.

Then, at step S63, when the client 12 transmits an http request that requests metadata to the web server 26, the web server 26 receives the http request.

Thereafter, at step S64, the web server 26 unicast-delivers metadata requested by the http request transmitted from the client 12, to the client 12.

In addition, at step S65, when the client 12 transmits an http request that requests (a segment of) content to the web server 26, the web server 26 receives the http request.

Thereafter, at step S66, the web server 26 unicast-delivers (a segment of) content requested by the http request transmitted from the client 12, to the client 12.

In the client 12 (FIG. 3), at step S71, the receiving unit 30 receives (the LCT packet of) the metadata which is multicast-delivered from the multicast server 25 at step S53.

Alternatively, in the client 12, at step S72, the receiving unit 30 transmits an http request that requests metadata.

The http request transmitted from the client 12 at step S72 is, as described above, received by the web server 26 at step S63. At step S64, metadata requested by the http request is unicast-delivered to the client 12.

At step S73, the receiving unit 30 of the client 12 receives the metadata which is unicast-delivered in the above-described manner.

Then, at step S74, the receiving unit 30 of the client 12 receives (the LCT packet of) the content which is multicast-delivered from the multicast server 25 at step S54 on the basis of the metadata received at step S71 or S73.

Alternatively, in the client 12, at step S75, the receiving unit 30 transmits an http request that requests content, on the basis of the metadata received at step S71 or S73.

The http request transmitted from the client 12 at step S75 is, as described above, received by the web server 26 at step S65. At step S66, content requested by the http request is unicast-delivered to the client 12.

At step S76, the receiving unit 30 of the client 12 receives the content which is unicast-delivered in the above-described manner.

Then, at step S77, the reproducing unit 33 of the client 12 reproduces the content received by the receiving unit 30 at step S74 or S76, on the basis of the metadata (MPD).

<Description of Data Delivered Through the Network 10>

Figure 5:
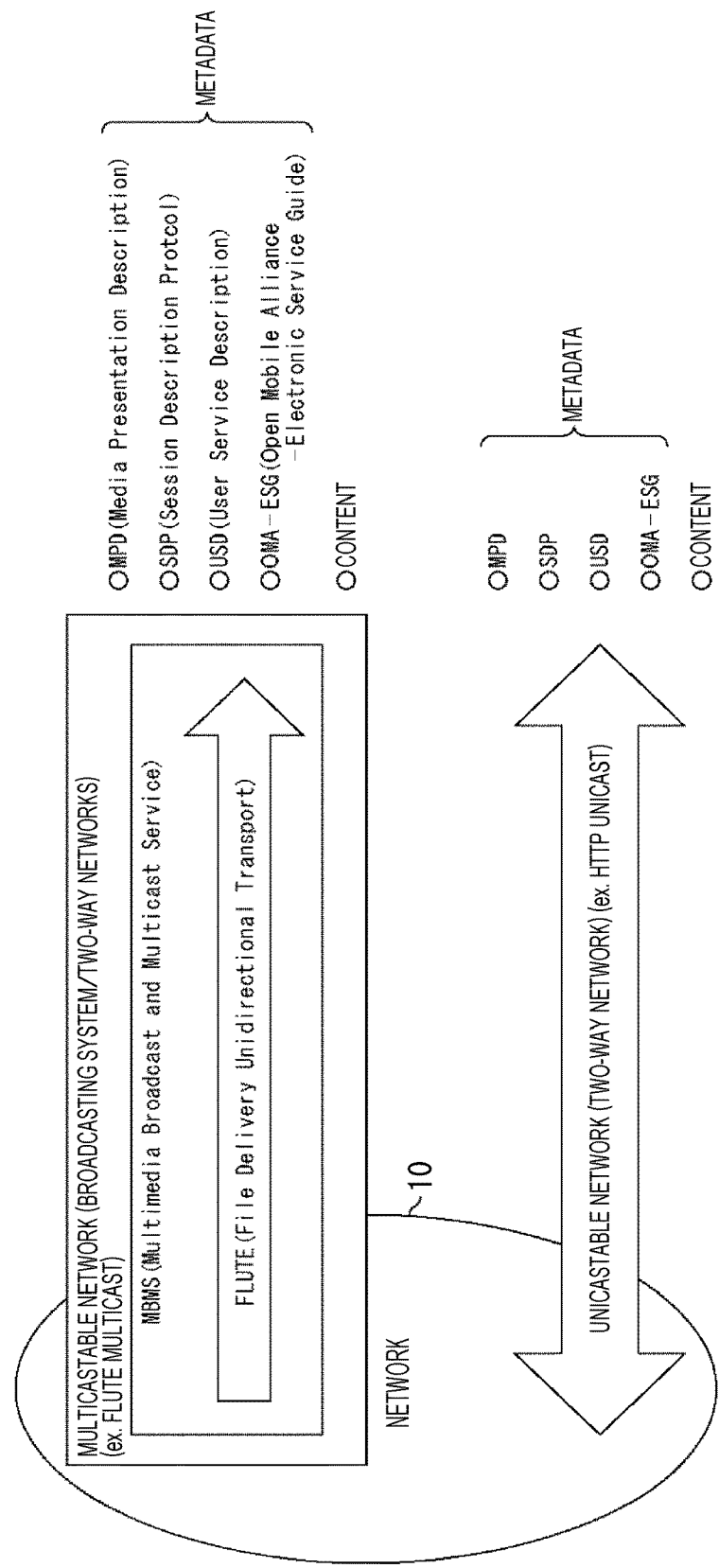
FIG. 5 is a diagram showing an example of data delivered through a network 10 in the content providing system.

FIG. 5 is a diagram showing an example of data delivered through the network 10 in the content providing system of FIG. 1.

In the content providing system, metadata, such as MPD, SDP, USD, and OMA-ESG, and (a segment or portion of) content are delivered to the client 12.

The metadata and content can be multicast-delivered and can be unicast-delivered.

For the metadata, a combination of MPD, SDP, and USD or a combination where OMA-ESG is added to the MPD, SDP, and USD is used.

Figure 6:
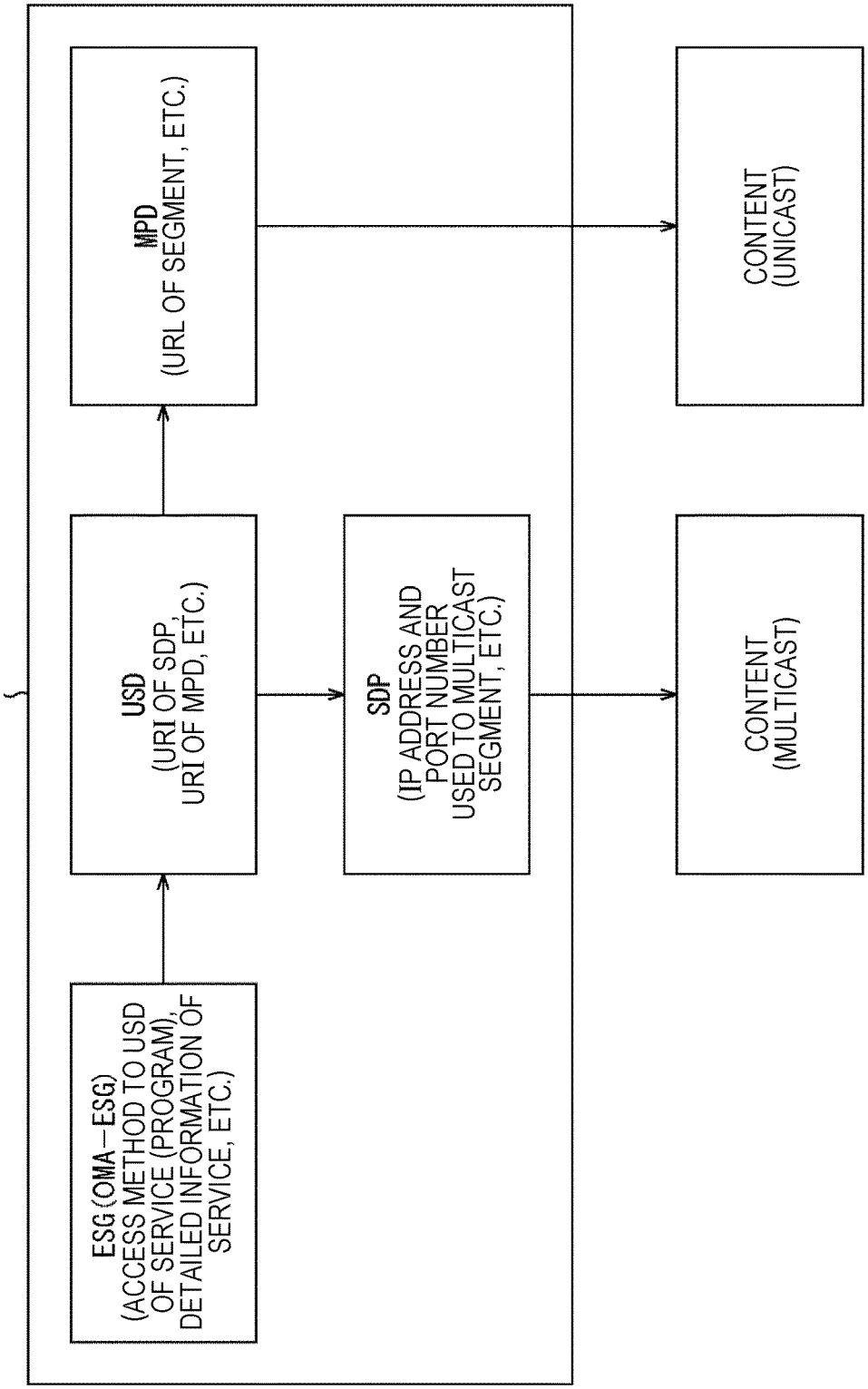
FIG. 6 is a diagram describing MPD, SDP, USD, and OMA-ESG.

FIG. 6 is a diagram describing MPD, SDP, USD, and OMA-ESG.

Now, assuming that a given program is a program of interest on which attention is focused, OMA-ESG of the program of interest describes detailed information of the program of interest, an access method to USD of the program of interest, etc.

Therefore, when the client 12 obtains the OMA-ESG of the program of interest, the client 12 can obtain the USD of the program of interest by referring to the access method to the USD which is described in the OMA-ESG.

The USD of the program of interest describes a Uniform Resource Identifier (URI) of SDP of the program of interest, a URI of MPD of the program of interest, etc.

Therefore, when the client 12 obtains the USD of the program of interest, the client 12 can obtain the SDP and MPD of the program of interest by referring to the URIs of the SDP and MPD described in the USD.

The SDP of the program of interest describes, for example, transport attributes such as an IP address and a port number that are used to multicast-deliver content of the program of interest.

Therefore, by obtaining the SDP of the program of interest, the content of the program of interest that is multicast-delivered on the basis of the IP address and port number described in the SDP can be received.

As described above, according to a combination of USD and SDP or a combination of USD, SDP, and OMA-ESG, the client 12 can recognize that content is multicast-delivered, and receive the content which is multicast-delivered.

The MPD of the program of interest describes a URL of a segment of the program of interest, information required to control the reproduction of the segment, etc.

Therefore, by obtaining the MPD of the program of interest, the segment of the program of interest can be received by unicast on the basis of the URL described in the MPD. In addition, the segment of the program of interest can be reproduced on the basis of the MPD of the program of interest.

Namely, since the MPD includes information required to control the reproduction of a segment, the MPD is required not only to receive the segment by unicast, but also to reproduce the segment.

<Configuration of a Segment>

Figure 7:
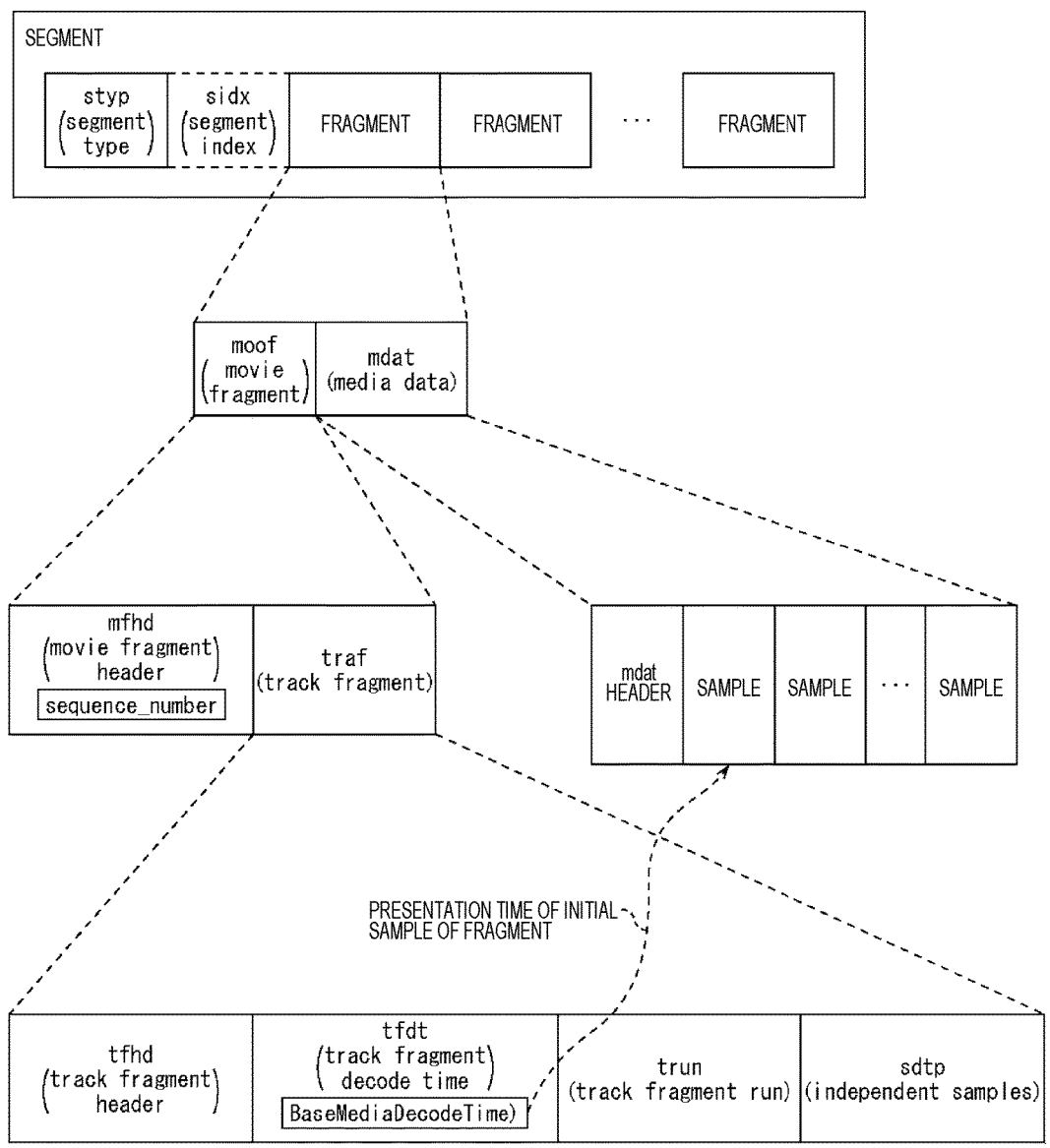
FIG. 7 is a diagram describing a configuration of a segment which is a DASH file delivery unit.

FIG. 7 is a diagram describing a configuration of a segment which is a DASH file delivery unit.

Here, the format of content to be delivered by DASH is not particularly limited, but in the present embodiment, for example, fragmented MP4 (file) is adopted as the format of content to be delivered by DASH.

A segment (Media Segment) includes a styp (segment type) (box), a required sidx (segment index) (box), and one or more fragments (MP4 fragments).

Here, the styp is set to 'msdh' or 'msix'. When the styp is 'msdh', the segment does not include a sidx. When the styp is 'msix', the segment includes a sidx. In the following, description of the sidx is omitted as appropriate.

Each fragment includes a movie fragment (moof) (box) and a media data (mdat) (box).

The mdat includes an mdat header and one or more samples. The sample is a minimum access unit for accessing media data (data such as video) in an MP4 file. Therefore, the media data in the MP4 file cannot be accessed in a unit smaller than the sample.

The moof includes a movie fragment header (mfhd) (box) and a traf (track fragment) (box).

The mfhd stores a sequence number (sequence_number). The sequence_number represents the position of the fragment that includes the sequence_number.

The traf includes a tfhd (track fragment header) (box), a track fragment decode time (tfdt) (box), a track fragment run (trun) (box), an independent samples (sdtp) (box), etc.

The tfdt stores BaseMediaDecodeTime. The BaseMediaDecodeTime represents the presentation time of the first sample among samples included in the fragment that includes the BaseMediaDecodeTime.

The trun stores information required to compute the presentation time of each sample included in the fragment that includes the trun.

Figure 8:
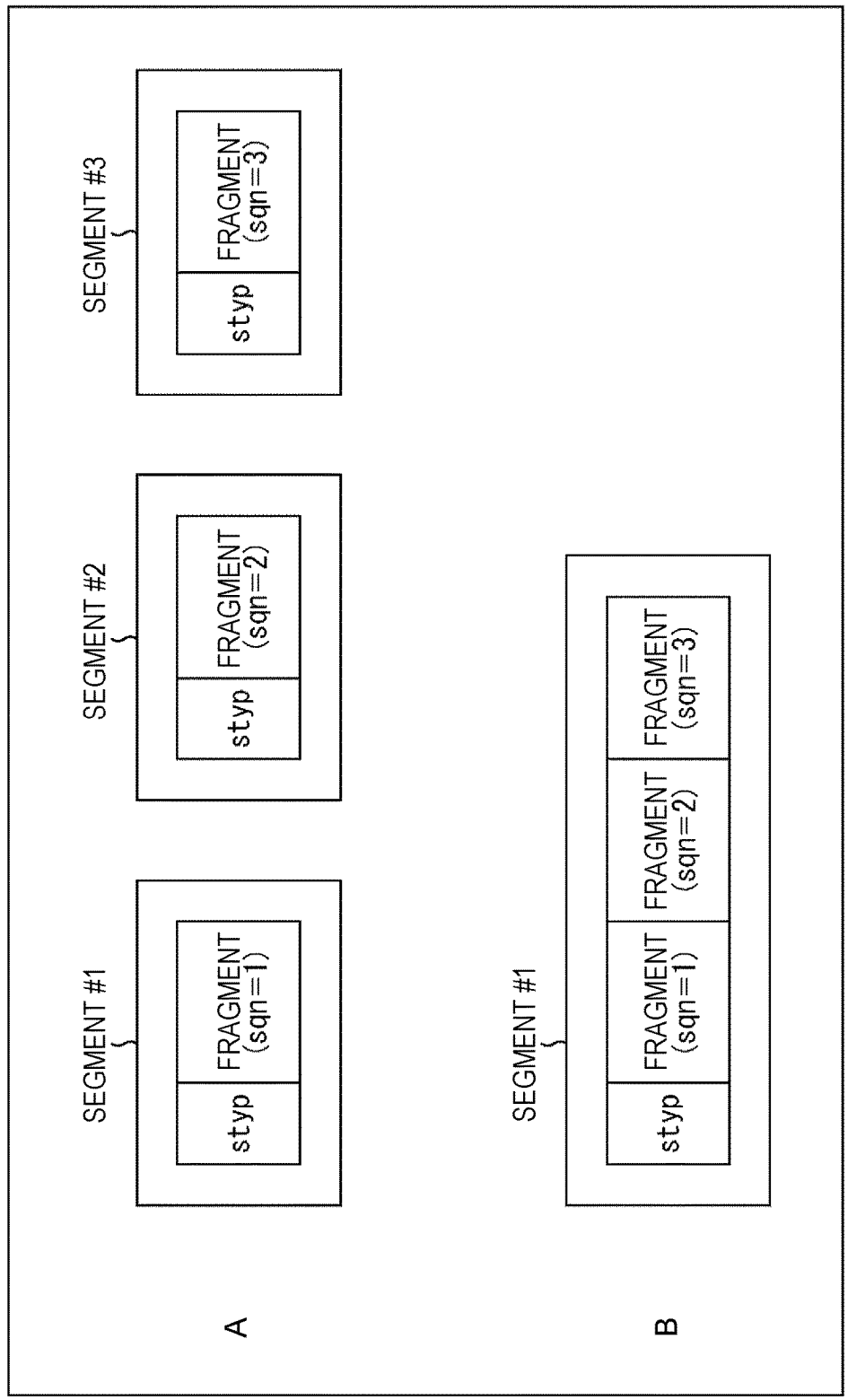
FIG. 8 is a diagram showing exemplary configurations of a segment including one fragment and a segment including a plurality of fragments.

FIG. 8 is a diagram showing exemplary configurations of a segment including one fragment and a segment including a plurality of fragments.

A of FIG. 8 shows an exemplary configuration of segments including one fragment.

In A of FIG. 8, each of three consecutive segments #1, #2, and #3 includes one fragment.

In this case, when the sequence number (sequence_number) (hereinafter, also referred to as sqn) of one fragment included in the initial segment #1 is, for example, 1, the sqn of one fragment included in the second segment #2 is, for example, 2 which is incremented by one from the sqn of the previous fragment=1. Furthermore, the sqn of one fragment included in the third segment #3 is, for example, 3 which is incremented by one from the sqn of the previous fragment=2.

B of FIG. 8 shows an exemplary configuration of a segment including a plurality of fragments.

In B of FIG. 8, a segment #1 includes three fragments.

In this case, when the sqn of an initial fragment in the segment #1 is, for example, 1, the sqn of the second fragment in the segment #1 is, for example, 2 which is incremented by one from the sqn of the previous fragment=1. Furthermore, the sqn of the third fragment in the segment #1 is, for example, 3 which is incremented by one from the sqn of the previous fragment=2.

In the following, for simplification of description, a segment includes one fragment as shown in A of FIG. 8, unless otherwise noted.

<Content Delivery Using a Segment as a File Delivery Unit>

Figure 9:
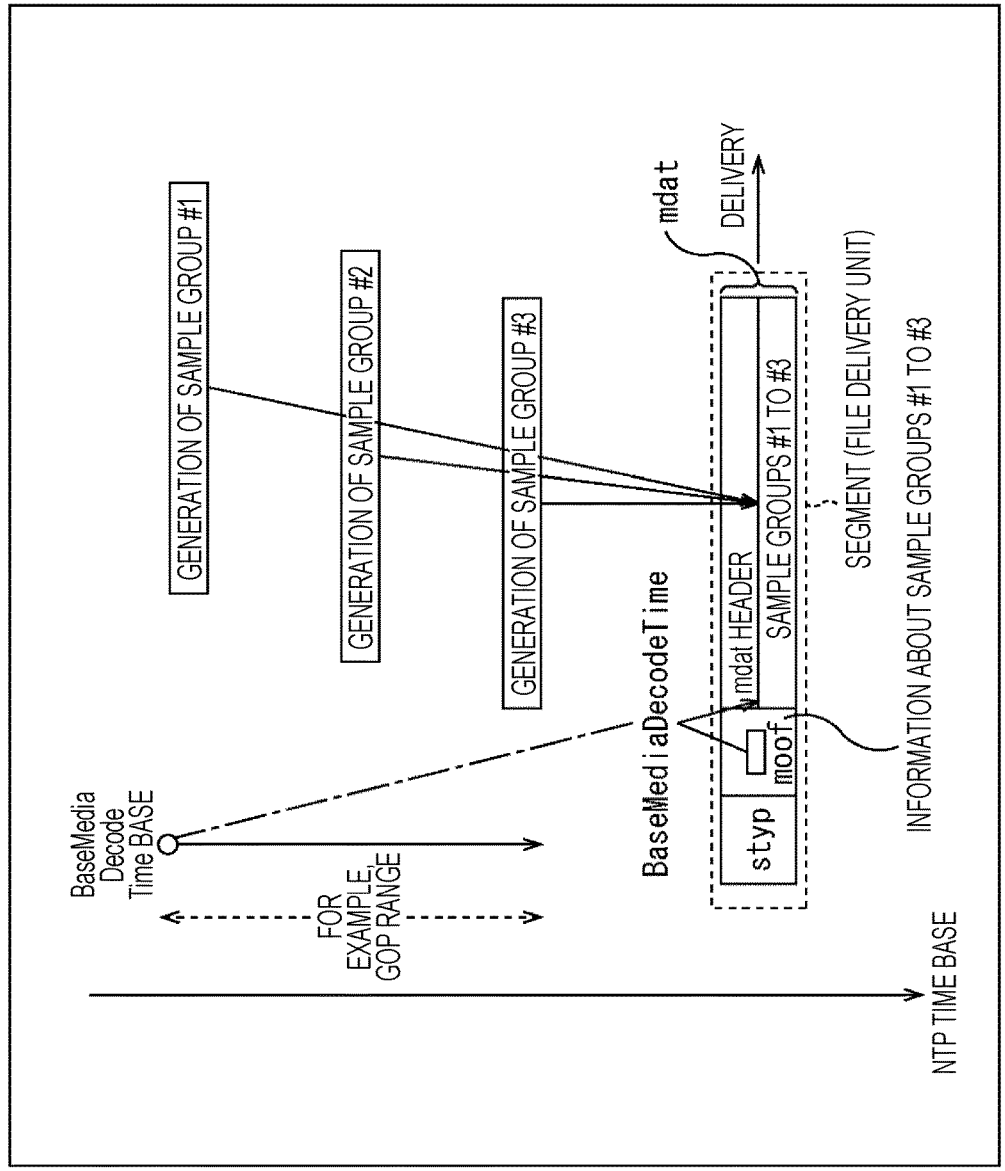
FIG. 9 is a diagram showing an example of content delivery using a segment as a file delivery unit in DASH.

FIG. 9 is a diagram showing an example of content delivery using a segment as a file delivery unit in DASH.

In FIG. 9, a plurality of, for example, three sample groups #1, #2, and #3 are sequentially generated as sample groups forming a fragment. Then, after completing the generation of the last sample group #3 of the fragment, the segmenter 22 in the delivery server 11 (FIG. 2) generates a fragment including an mdat where the sample groups #1 to #3 are disposed; and a moof for the sample groups #1 to #3, and generates a segment including the fragment. Thereafter, the FLUTE streamer 24 and the multicast server 25 deliver the segment.

Here, each of the sample groups #1, #2, and #3 is constituted by one or more samples. In addition, the moof for the sample groups #1 to #3 is performed, for example, in parallel with the generation of the sample groups #1 to #3.

Note that for a range of content serving as a fragment (the sample groups #1 to #3 disposed as an mdat of the fragment), for example, a Group Of Picture (GOP) range which is a minimum randomly accessible unit can be adopted.

However, the range of content serving as a fragment is not limited to the GOP range.

Meanwhile, for GOP time, for example, about 0.5 to 2 seconds are often adopted. Therefore, when the GOP range is adopted as the range of content serving as a fragment, a moof and furthermore a segment are generated after waiting at least the GOP time which is about 0.5 to 2 seconds. Namely, the generation of a segment requires at least the GOP time.

As a result, when multicast delivery is performed using a segment as a file delivery unit, delivery of a segment needs to wait at least the GOP time that is required to generate the segment.

Delivery of moving images with higher image quality is expected in the future. In that case, the amount of data of a segment becomes enormous. When such a segment with an enormous amount of data is delivered after waiting the GOP time, network bandwidth may be excessively used and accordingly shaping may be required.

Therefore, using a segment as a file delivery unit ends up with delay in content reception and start of buffering by a client.

Hence, the delivery server 11 uses, as a file delivery unit, data including part of a fragment (hereinafter, also referred to as portion) which is smaller than a segment, and multicast-delivers the portion, and thereby promptly delivers (data of) content. By this, delay in content reception and start of buffering by a client is suppressed.

<Content Delivery Using a Portion as a File Delivery Unit>

Figure 10:
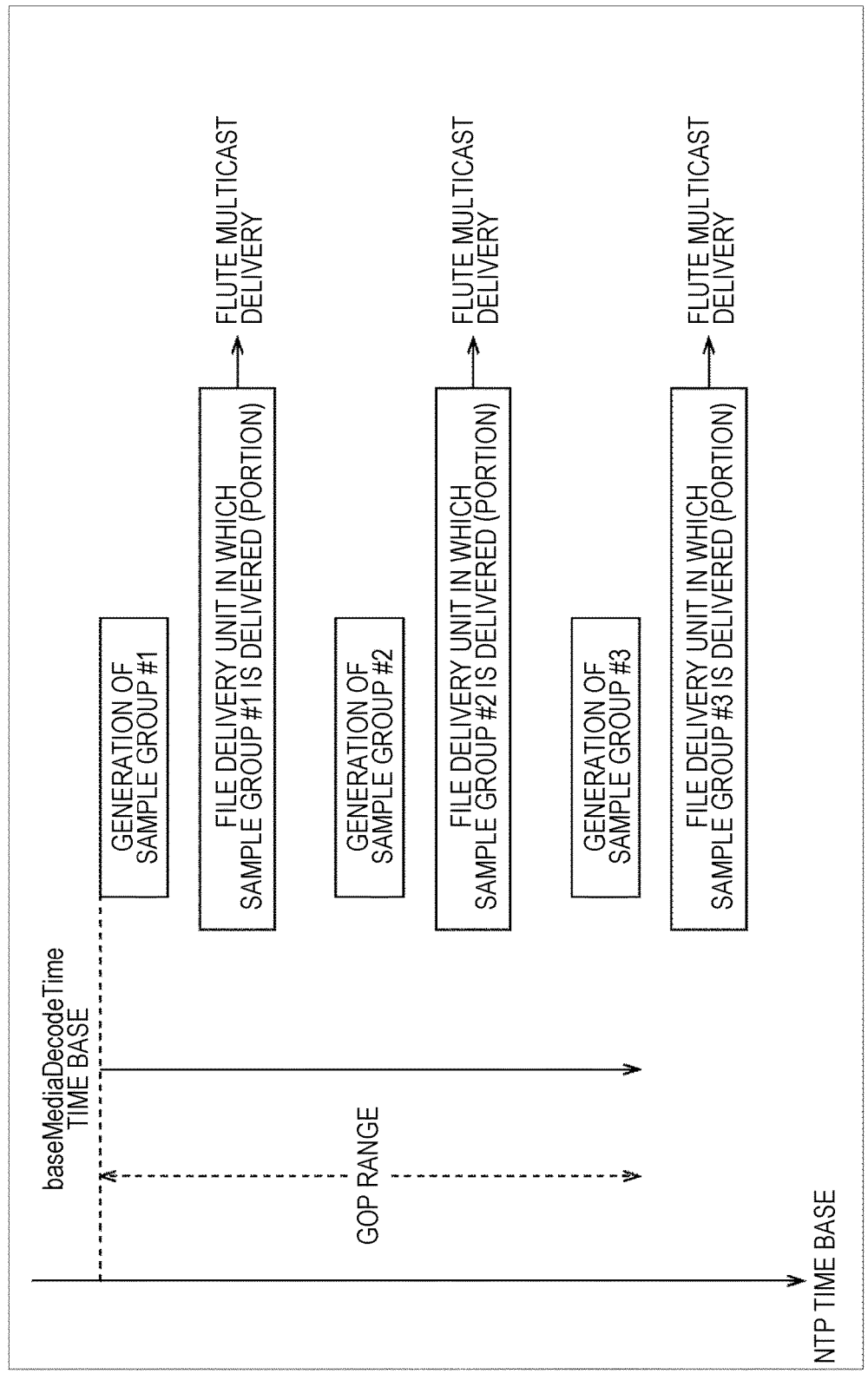
FIG. 10 is a diagram describing an overview of content delivery using a portion as a file delivery unit in the delivery server 11.

FIG. 10 is a diagram describing an overview of content delivery using a portion as a file delivery unit in the delivery server 11.

In FIG. 10, as in the case of FIG. 9, sample groups #1, #2, and #3 are sequentially generated as sample groups forming a fragment.

However, in FIG. 10, a portion that includes the sample group #1 and that serves as a file delivery unit is generated at the segmenter 22 of the delivery server 11 (FIG. 2) without waiting for generation of the last sample group #3 of the fragment to be completed and at the point in time of having generated the sample group #1, and multicast-delivered at the FLUTE streamer 24 and the multicast server 25.

Furthermore, in FIG. 10, a portion that includes the sample group #2 and that serves as a file delivery unit is generated at the segmenter 22 at the point in time of having generated the next sample group #2, multicast-delivered at the FLUTE streamer 24 and the multicast server 25.

Then, a portion that includes the sample group #3 and that serves as a file delivery unit is generated at the segmenter 22 when the segmenter 22 completes the generation of the last sample group #3 of the fragment, and multicast-delivered at the FLUTE streamer 24 and the multicast server 25.

As described above, by generating a portion that is smaller than a segment and that includes a sample group (in FIG. 10, each of the sample groups #1, #2, and #3) which is part of a fragment, and multicast-delivering the portion, content is promptly delivered, enabling to suppress delay in content reception and start of buffering by a client.

Here, when the sample groups #1 to #3 are, for example, one-GOP data, the sample group #1 corresponds to, for example, data of an I-picture which is encoded first in the GOP. Then, the sample group #2 corresponds to data of one or more P-pictures or B-pictures which are encoded after the I-picture of the GOP, and the sample group #3 corresponds to data of the remaining P-picture or B-picture of the GOP.

<Portion>

Figure 11:
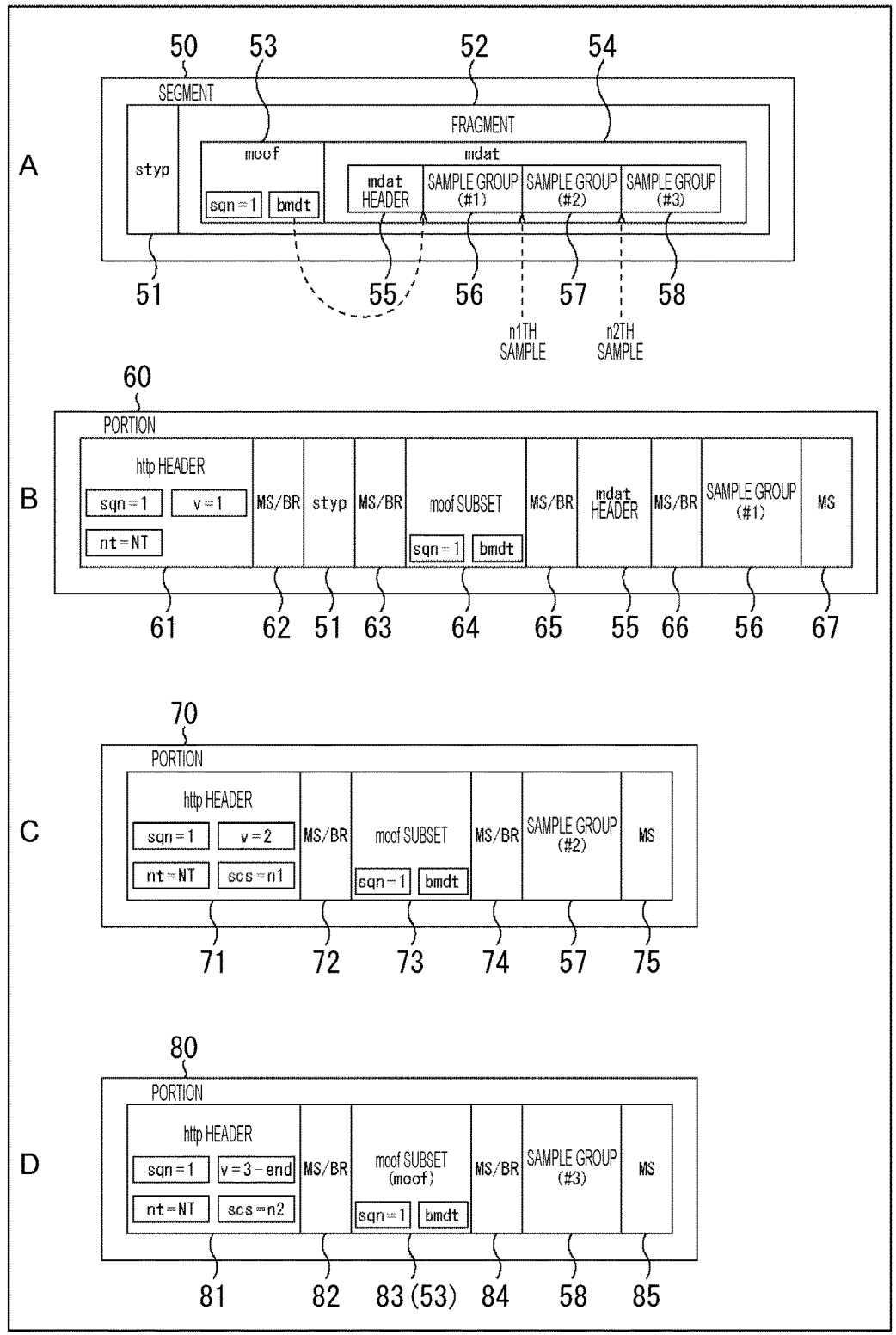
FIG. 11 is a diagram showing an example of a relationship between a segment and portions.

FIG. 11 is a diagram showing an example of a relationship between a segment and portions.

A of FIG. 11 shows an example of a segment.

In A of FIG. 11, a segment 50 includes a styp 51 and (one) fragment 52.

The fragment 52 is constituted by a moof 53 and an mdat 54.

As described in FIG. 7, the moof 53 stores at least the sequence number sqn of the fragment 52; and BaseMediaDecodeTime (hereinafter, also referred to as bmdt) representing the presentation time of the first sample in the mdat 54 of the fragment 52 (in A of FIG. 11, the first sample in a sample group 56).

Here, in A of FIG. 11, the sequence number sqn of the fragment 52 is set to 1.

The mdat 54 stores an mdat header 55 and three sample groups 56, 57, and 58 in this order. The sample groups 56 to 58 correspond to, for example, the sample groups #1 to #3 of FIG. 10, respectively.

The first sample in the second sample group 57 among the three sample groups 56 to 58 stored in the mdat 54 is an n1th sample from the top of the initial sample group 56.

In addition, the first sample in the third sample group 58 among the three sample groups 56 to 58 is an n2th (>n1) sample from the top of the initial sample group 56.

Here, a portion in which a given sample stored in the mdat is located from the first sample of the mdat is also hereinafter referred to as sample number.

In A of FIG. 11, the sample number of the first sample in the sample group 57 is n1, and the sample number of the first sample in the sample group 58 is n2.

B, C, and D of FIG. 11 show examples of a portion that includes part of the fragment 52 included in the segment 50 for when the segment 50 in A of FIG. 11 is generated.

Specifically, B of FIG. 11 shows an example of a portion including the sample group 56 which is part of the fragment 52. In addition, C of FIG. 11 shows an example of a portion including the sample group 57 which is another part of the fragment 52, and D of FIG. 11 shows an example of a portion including the sample group 58 which is still another part of the fragment 52.

In FIG. 11, an http response (file) is adopted as a portion (file).

In B of FIG. 11, a portion 60 is an http response including the initial sample group 56 of the fragment 52. In the portion 60, an http header 61, an MS/BR 62, a styp 51, a moof subset 64, an MS/BR 65, an mdat header 55, an MS/BR 66, the sample group 56, and an MS 67 are disposed in this order. The MS/BR 62 to the MS 67 constitute a message body.

The http header 61 is an http header indicating that the message body is a multipart message body. The http header 61 includes a sequence number sqn, a version v, and an NTP time nt.

The sequence number sqn in the http header 61 is set to 1 which is the same as the sequence number sqn stored in the moof 53 of the fragment 52 that includes the sample group 56 (serving as part of the fragment 52) included in the portion 60.

The version v represents the position, in a fragment, of a sample group serving as part of the fragment and included in a portion that includes the version v. The version v is, for example, an integer that is incremented by one with an initial value being 1, for the same sequence number sqn (in sqn scope).

Part of the fragment 52 that is included in the portion 60 including the version v in the http header 61 is the sample group 56, and the position of the sample group 56 in the fragment 52 is the first position, and thus, the version v in the http header 61 is set to 1.

Note that in a case in which a segment includes, for example, as shown in FIG. 9, three fragments as a plurality, and the sequence numbers sqn of the three fragments are 1, 2, and 3, respectively, when, for instance, six (=3×2) portions are generated each including sample groups dividing the sample group of each fragment in two, sets (sqn, v) of a sequence number sqn and a version v of the respective six portions are (1, 1), (1, 2), (2, 1), (2, 2), (3, 1), and (3, 2), respectively.

The NTP time nt in the http header 61 represents an NTP time NT corresponding to a BaseMediaDecodeTime (bmdt) stored in the moof 53 of the fragment 52, a part of which (the sample group 56) is included in the portion 60 that includes the NTP time nt, i.e., a bmdt representing the presentation time of the first sample of the fragment 52 (the first sample in the sample group 56).

The MS/BR 62 represents a multipart-separater and a byte range of the styp 51 disposed immediately thereafter.

The MS/BR 63 represents a multipart-separater and a byte range of the moof subset 64 disposed immediately thereafter.

The moof subset 64 is a subset of the moof 53 that can be generated until the first (initial) sample group 56 disposed in the portion 60 among the three sample groups 56 to 58 of the fragment 52 is generated. The moof subset 64 includes the sequence number sqn and bmdt stored in the moof 53.

According to the moof subset 64 that is a subset of the moof 53 and that can be generated until the sample group 56 is generated, the sample group 56 can be reproduced.

The MS/BR 65 represents a multipart-separater and a byte range of the mdat header 55 disposed immediately thereafter.

The MS/BR 66 represents a multipart-separater and a byte range of the sample group 56 disposed immediately thereafter.

The MS 67 represents a multipart-separater.

Note that although in B of FIG. 11 the styp 51 is included in the portion 60 including the initial sample group 56 of the fragment 52, the styp 51 (furthermore, a sidx which is not shown) can be delivered included in a different http response than the portion 60.

In C of FIG. 11, a portion 70 is an http response including the second sample group 57 of the fragment 52. In the portion 70, an http header 71, an MS/BR 72, a moof subset 73, an MS/BR 74, the sample group 57, and an MS 75 are disposed in this order. The MS/BR 72 to the MS 75 constitute a message body.

The http header 71 is an http header indicating that the message body is a multipart message body. The http header 71 includes a sequence number sqn, a version v, and an NTP time nt, and a sample count start SampleCountStart (scs).

The sequence number sqn in the http header 71 is set to 1 which is the same as the sequence number sqn stored in the moof 53 of the fragment 52 that includes the sample group 57 (serving as part of the fragment 52) included in the portion 70.

The version v in the http header 71 is set to 2. Namely, since the portion 70 includes the second sample group 57 among the sample groups 56 to 58 of the fragment 52, the version v in the http header 71 is set to 2.

The NTP time nt in the http header 71 represents an NTP time corresponding to the bmdt stored in the moof 53 of the fragment 52, a part of which (the sample group 57) is included in the portion 70 that includes the NTP time nt. The NTP time nt in the http header 71 is the same as the NTP time nt=NT in the http header 61.

The sample count start scs represents the position of the first sample in a sample group included in a portion that includes the sample count start scs, from the first sample of a fragment.

The first sample in the sample group 57 included in the portion 70 is, as described in A of FIG. 11, the n1th sample from the top of the initial sample group 56, and thus, the sample count start scs in the http header 71 is set to n1.

The MS/BR 72 represents a multipart-separater and a byte range of the moof subset 73 disposed immediately thereafter.

The moof subset 73 is a subset of the moof 53 that can be generated until the second sample group 57 disposed in the portion 70 among the three sample groups 56 to 58 of the fragment 52 is generated. The moof subset 73 includes the sequence number sqn and bmdt stored in the moof 53.

In the moof subset 73 that is a subset of the moof 53 and that can be generated until the sample group 57 is generated, information required to reproduce the sample group 57 is added to the moof subset 64 which is generated until the sample group 56 is generated. Thus, according to the moof subset 73, the sample group 57 and furthermore the sample group 56 which is generated until the sample group 57 is generated can be reproduced.

The MS/BR 74 represents a multipart-separater and a byte range of the sample group 57 disposed immediately thereafter.

The MS 75 represents a multipart-separater.

In D of FIG. 11, a portion 80 is an http response including the third sample group 58 of the fragment 52. In the portion 80, an http header 81, an MS/BR 82, a moof subset 83, an MS/BR 84, the sample group 58, and an MS 85 are disposed in this order. The MS/BR 82 to the MS 85 constitute a message body.

The http header 81 is an http header indicating that the message body is a multipart message body. The http header 81 includes a sequence number sqn, a version v, and an NTP time nt, and a sample count start scs.

The sequence number sqn in the http header 81 is set to 1 which is the same as the sequence number sqn stored in the moof 53 of the fragment 52 that includes the sample group 58 (serving as part of the fragment 52) included in the portion 80.

The version v in the http header 81 is set to 3. Namely, since the portion 80 includes the third sample group 58 among the sample groups 56 to 58 of the fragment 52, the version v in the http header 81 is set to 3.

Furthermore, since the sample group 58 included in the portion 80 is the last sample group of the fragment 52, i.e., since the sample group 58 is the last sample group with a sequence number sqn of 1, the version v in the http header 81 is set to 3 which is the position of the sample group 58 in the fragment 52, and "-end" which is information indicating that the sample group is the last sample group of the fragment.

Therefore, the client 12, for example, that receives a portion can recognize, by the version v, the position of a sample group (serving as part of a fragment) included in the portion and whether the sample group is the last sample group of the fragment.

The NTP time nt in the http header 81 represents an NTP time corresponding to the bmdt stored in the moof 53 of the fragment 52, a part of which (the sample group 58) is included in the portion 80 that includes the NTP time nt. The NTP time nt in the http header 81 is the same as the NTP time nt=NT in the http headers 61 and 71.

The sample count start scs represents, as described above, the position of the first sample in a sample group included in a portion that includes the sample count start scs, from the first sample of a fragment.

Therefore, the sample count start scs in the http header 81 is set to n2. Namely, since the first sample in the sample group 58 included in the portion 80 is, as described in A of FIG. 11, the n2th sample from the top of the initial sample group 56, the sample count start scs in the http header 81 is set to n2.

The MS/BR 82 represents a multipart-separater and a byte range of the moof subset 83 disposed immediately thereafter.

The moof subset 83 is a subset of the moof 53 that can be generated until the third sample group 58 disposed in the portion 80 among the three sample groups 56 to 58 of the fragment 52 is generated. The moof subset 83 includes the sequence number sqn and bmdt stored in the moof 53.

Here, the moof subset 83 is a subset of the moof 53 that can be generated until the third sample group 58 disposed in the portion 80, i.e., the last sample group 58 of the fragment 52, is generated, and thus, is equal to the moof 53.

As described above, since the moof subset 83 which is a subset of the moof 53 that can be generated until the sample group 58 is generated is equal to the moof 53, according to the moof subset 83, the sample group 58 and furthermore the sample groups 56 and 57 which are generated until the sample group 58 is generated can be reproduced.

The MS/BR 84 represents a multipart-separater and a byte range of the sample group 58 disposed immediately thereafter.

The MS 85 represents a multipart-separater.

As described above, since a portion which is an http response includes a sequence number sqn and a version v in an http header, the client 12 (other apparatuses) having received the portion can perform reproduction such that the position, in a segment, of a sample group included in the portion is recognized on the basis of the sequence number sqn and the version v, or perform reproduction such that a segment is formed as necessary.

In addition, a portion includes a moof subset which is moof information required to reproduce a sample group included in the portion. Thus, the client 12 can start, before receiving all portions (sample groups) forming a segment and at the point in time of having received one portion, the reproduction of a sample group included in the one received portion when the sample group included in the one portion is a sample group that can be reproduced alone (e.g., an I-picture sample group), or when the sample group can be reproduced using an already received sample group.

Note that the version v can be included in the moof subset, together with the sequence number sqn. However, when the version v is included in the moof subset, together with the sequence number sqn, the existing moof definitions need to be extended so as to include the version v in the moof. On the other hand, when the version v is included in the http header, there is no need to extend the existing moof definitions.

In addition, in FIG. 11, the http headers 71 and 81 of the portions 70 and 80 that include the second and subsequent sample groups 57 and 58 of the fragment 52, respectively, include a sample count start scs, and the http header 61 of the portion 60 including the initial sample group 56 of the fragment 52 does not include a sample count start scs; however, a sample count start scs can also be included in the http header 61 of the portion 60 that includes the initial sample group 56 of the fragment 52.

However, the position of the first sample in an initial sample group of a fragment from the first sample of the fragment is always 1 and is a fixed value, and thus, for an http header of a portion that includes the initial sample group of the fragment (an http header with a version v of 1), as shown in B of FIG. 11, a sample count start scs can be omitted. By this, the size of the http header can be reduced.

In addition, a portion which is an http response can include, in an http header, an NTP time nt corresponding to a bmdt stored in a moof of a fragment (a bmdt representing the presentation time of the first sample of the fragment). Thus, even if corresponding MPD is not available when the client 12 receives a portion, the client 12 can reproduce a sample group included in the portion.

Namely, content includes, for example, content whose reproduction timing needs to be controlled over a time axis of an absolute time represented by an NTP time, such as a live broadcast program. For samples of such content, there is a need to compute an NTP time serving as an absolute time at which each sample is mapped (displayed).

Here, the presentation time of an Nth sample of a fragment (PresentationTime(CompositionTime) of Nth Sample) can be computed according to the following equation.

PresentationTime(CompositionTime) of $N$th Sample=BaseMediaDecodeTime+Sum of SampleDuration of($N-1$)Samples+CompositionTimeOffset of $N$th Sample Note that Sum of SampleDuration of (N−1) Samples and CompositionTimeOffset of Nth Sample can be obtained from information (sampleCount, SampleDuration, and CompositionTimeOffset) stored in the moof of the fragment, and BaseMediaDecodeTime is stored as a bmdt in the moof.

An absolute time of a sample can be obtained if an NTP time is known that corresponds to BaseMediaDecodeTime used to compute the presentation time of the sample.

The DASH MPD describes an NTP time corresponding to BaseMediaDecodeTime (BaseMediaDecodeTime=0) which is a starting point, and thus, when, for example, obtention of MPD is guaranteed, the http header does not need to include an NTP time nt corresponding to a bmdt stored in the moof of the fragment.

However, by including, in an http header, an NTP time nt corresponding to a bmdt stored in a moof of a fragment (a bmdt representing the presentation time of the first sample of the fragment), when the client 12 receives a portion, the client 12 can compute NTP times serving as the absolute times of respective samples in a sample group included in the portion, on the basis of the NTP time nt included in the http header of the portion, even if corresponding MPD is not available, and can reproduce the samples according to the NTP times.

In addition, a portion which is an http response can include, in an http header, a sample count start scs representing the position of the first sample in a sample group included in the portion, from the first sample of a fragment. Thus, even if one of a plurality of portions forming a segment (a plurality of portions that respectively include a plurality of sample groups included in a segment) is missing, (a sample group included in) a portion subsequent to the missing portion can be reproduced.

Namely, when it is guaranteed that the client 12 receives all of a plurality of portions forming a segment, even if there is no sample count start scs, a sample number indicating in which position each sample of each portion is located from the first sample of a fragment can be recognized, and on the basis of the sample number, information required to reproduce a sample is obtained from a moof subset, and the sample can be reproduced.

However, when one of a plurality of portions forming a segment is missing, for a sample included in a portion subsequent to the missing portion, if a sample count start scs is not available, then a sample number cannot be recognized, making it difficult to perform reproduction.

By including a sample count start scs in an http header of a portion, even if one of a plurality of portions forming a segment is missing, for a sample included in a portion subsequent to the missing portion, a sample number is recognized by the sample count start scs and thus reproduction can be performed.

In addition, a portion includes a moof subset that is a subset of the moof 53 and that can be generated until a sample group included in the portion is generated. Thus, the client 12 having received a portion can start the reproduction of a sample group included in the received portion, on the basis of a moof subset included in the portion, without waiting for a subsequent portion.

Note that an http header of a portion can include, in addition to the above, for example, a File Delivery Table (FDT) which is various attribute information to be delivered by FLUTE that multicast-delivers the portion. In this case, the client 12 can use the FDT included in the http header of the portion for reception of data to be FLUTE-multicast-delivered.

FIG. 12 is a diagram showing an example of description of an http response serving as the portion 60 of FIG. 11.

Description 100 is the http header 61, and "X-MoofSeqNumVersion" in description 101 of the http header 61 and "X-NTPTimeStamp" in description 102 are newly defined headers.

The "X-MoofSeqNumVersion" in the description 101 is a header representing a sequence number sqn and a version v, and has a variable sqn representing a sequence number and a variable v representing a version. The variable sqn is set to 1 which is the sequence number sqn of the fragment 52, and the variable v is set to 1 which is the position, in the fragment 52, of the sample group 56 included in the portion 60.

The "X-NTPTimeStamp" in the description 102 is a header representing an NTP time nt (corresponding to BaseMediaDecodeTime). In FIG. 12, the "X-NTPTimeStamp" is set to 2890844526 as an NTP time NT corresponding to a bmdt representing the presentation time of the first sample of the fragment 52 (the first sample in the sample group 56).

Description 103 is the MS/BR 62, and "SEPARATER_STRING" in the description 103 represents a multipart-separater. In addition, "Content-range: bytes 492-499/124567654" in the description 103 represents a byte range of the immediately subsequent styp 51.

Here, the byte range "Content-range: bytes 492-499/124567654" in the description 103 indicates that the fragment size is 124567654 bytes and the immediately subsequent styp 51 has 492-499 bytes of the 124567654 bytes.

The description 103 is followed by a byte sequence of the styp 51.

Description 104 after the byte sequence of the styp 51 is the MS/BR 63, and "Content-range: bytes 500-991/124567654" in the description 104 represents a byte range of the immediately subsequent moof subset 64.

Here, for the byte range of the moof subset, upon generation of a portion including an initial sample group of a fragment (in FIG. 11, the portion 60), a byte range of a moof (in FIG. 11, the moof 53) of the fragment is predicted, and a predicted value of the byte range of the moof is adopted as the byte ranges of moof subsets of respective portions (in FIG. 11, the portions 60, 70, and 80) that include sample groups of the fragment. Therefore, the byte ranges of the moof subset 64 of the portion 60, the moof subset 73 of the portion 70, and the moof subset 83 of the portion 80 have the same value (the predicted value of the byte range of the moof 53).

The description 104 is followed by a byte sequence of the moof subset 64.

Description 105 after the byte sequence of the moof subset 64 is the MS/BR 65, and "Content-range: bytes 992-999/124567654" in the description 105 represents a byte range of the immediately subsequent mdat header 55.

The description 105 is followed by a byte sequence of the mdat header 55.

Description 106 after the byte sequence of the mdat header 55 is the MS/BR 66, and "Content-range: bytes 1000-4999/124567654" in the description 106 represents a byte range of the immediately subsequent sample group 56.

The description 106 is followed by a byte sequence of the sample group 56.

Description 107 after the byte sequence of the sample group 56 is the MS 67.

FIG. 13 is a diagram showing an example of description of an http response serving as the portion 70 of FIG. 11.

Description 120 is the http header 71, and "X-MoofSeqNumVersion" in description 121 of the http header 71, "X-NTPTimeStamp" in description 122, and "X-SampleCountStart" in description 123 are newly defined headers.

The "X-MoofSeqNumVersion" in the description 121 is, as described in FIG. 12, a header representing a sequence number sqn and a version v. A variable sqn representing a sequence number is set to 1 which is the sequence number sqn of the fragment 52, and a variable v representing a version is set to 2 which is the position, in the fragment 52, of the sample group 57 included in the portion 70.

The "X-NTPTimeStamp" in the description 122 is, as described in FIG. 12, a header representing an NTP time nt, and is set to 2890844526 which is the same as that for the case of FIG. 11, as an NTP time NT corresponding to a bmdt representing the presentation time of the first sample of the fragment 52.

The "X-SampleCountStart" in the description 123 is a header representing a sample count start scs. In FIG. 13, the "X-SampleCountStart" is set to the sample number n1 of the first sample in the sample group 57 included in the fragment 70.

Description 124 is the MS/BR 72, and "Content-range: bytes 500-991/124567654" in the description 124 represents a byte range of the immediately subsequent moof subset 73, and is the same as the byte range of the moof subset 64 in the description 105 of FIG. 12 (the predicted value of the byte range of the moof 53).

The description 124 is followed by a byte sequence of the moof subset 73.

Description 125 after the byte sequence of the moof subset 73 is the MS/BR 74, and "Content-range: bytes 5000-7999/124567654" in the description 125 represents a byte range of the immediately subsequent sample group 57.

The description 125 is followed by a byte sequence of the sample group 57.

Description 126 after the byte sequence of the sample group 57 is the MS 75.

The portion 80 of FIG. 11 is configured in a similar manner as the portion 70 of FIG. 13.

<Content Delivery in Portion Units>

Figure 14:
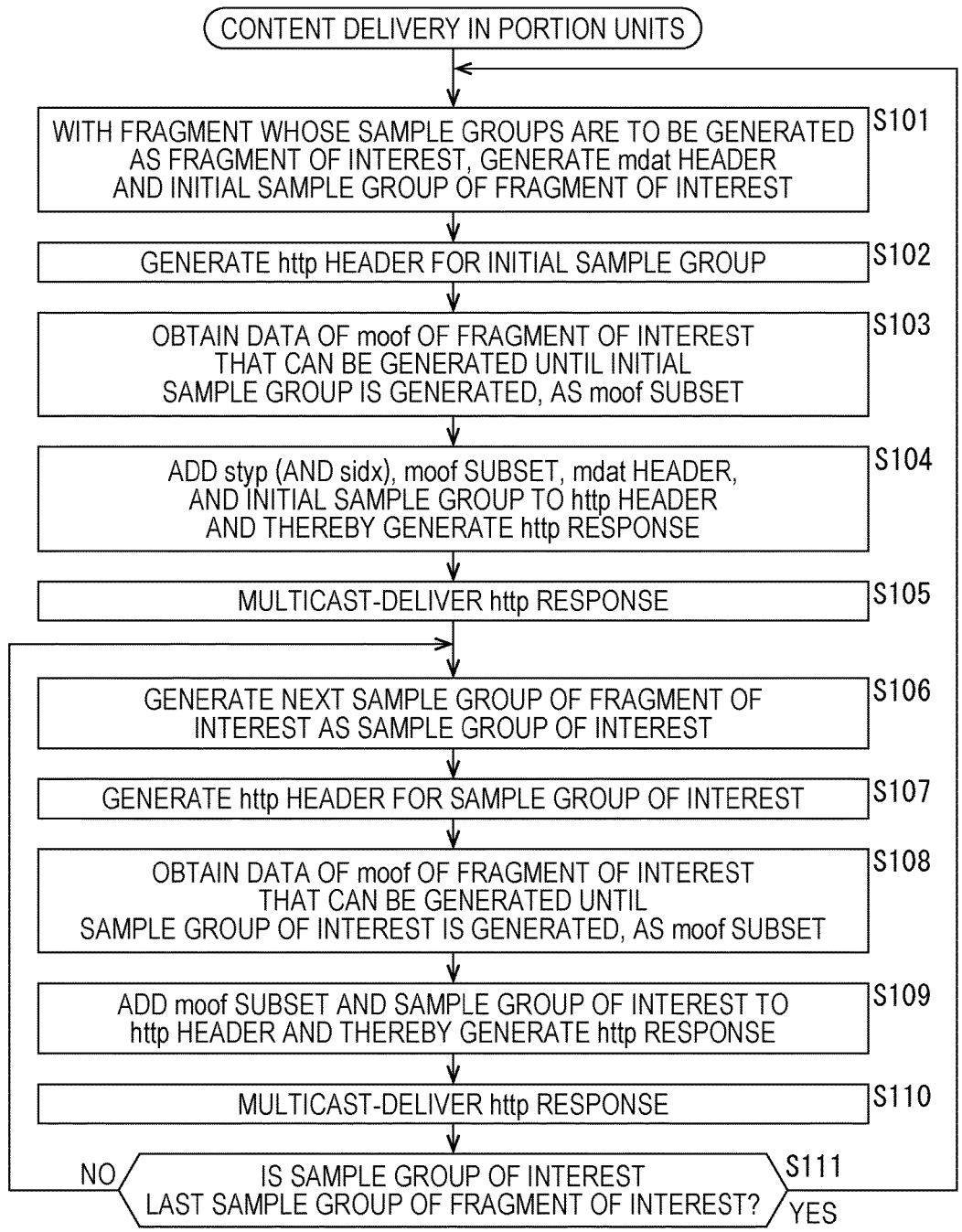
FIG. 14 is a flowchart describing an example of processes for content delivery in portion units.

FIG. 14 is a flowchart describing an example of processes for content delivery in portion units.

At step S101, with a fragment whose sample groups are to be generated (e.g., the fragment 52 of FIG. 11) as a fragment of interest, the segmenter 22 of the delivery server 11 (FIG. 2) generates an mdat header and an initial sample group of the fragment of interest, and processing proceeds to step S102.

At step S102, the segmenter 22 generates an http header for the initial sample group (e.g., the http header 61 of FIG. 11), and processing proceeds to step S103.

Specifically, the segmenter 22 generates, as an http header for the initial sample group, an http header including the same sequence number sqn as a sequence number stored in a moof of the fragment of interest; a version v of 1 representing the position of the initial sample group in the fragment of interest; and an NTP time nt corresponding to a bmdt stored in the moof of the fragment of interest.

At step S103, the segmenter 22 obtains part of the moof of the fragment of interest that can be generated until the initial sample group is generated (a portion of the moof that is required to reproduce the initial sample group), as a moof subset for the initial sample group, and processing proceeds to step S104.

At step S104, the segmenter 22 adds the http header for the initial sample group to a styp (and a required sidx) of a segment including the fragment of interest, the moof subset for the initial sample group, the mdat header of the fragment of interest, and the initial sample group, and thereby generates an http response serving as a portion, and supplies the http response to the FLUTE streamer 24, and processing proceeds to step S105.

Here, when the segment including the fragment of interest includes a plurality of fragments and the fragment of interest is not an initial one of the plurality of fragments, the http response serving as a portion and generated at step S104 does not include a styp (and a required sidx).

At step S105, the FLUTE streamer 24 packetizes the http response serving as a portion and supplied from the segmenter 22 into an LCT packet, and the multicast server 25 multicast-delivers the LCT packet, and processing proceeds to step S106.

At step S106, the segmenter 22 generates the next sample group of the fragment of interest as a sample group of interest, and processing proceeds to step S107.

At step S107, the segmenter 22 generates an http header for the sample group of interest (e.g., the http header 71 or 81 of FIG. 11), and processing proceeds to step S108.

Specifically, the segmenter 22 generates, as an http header for the sample group of interest, an http header including the same sequence number sqn as the sequence number stored in the moof of the fragment of interest; a version v representing the position of the sample group of interest in the fragment of interest; an NTP time nt corresponding to a bmdt stored in the moof of the fragment of interest; and a sample count start scs representing the sample number of the first sample in the sample group of interest.

At step S108, the segmenter 22 obtains part of the moof of the fragment of interest that can be generated until the sample group of interest is generated and that is required to reproduce the sample group of interest (and the sample group generated until generating the sample group of interest of the fragment of interest), as a moof subset for the sample group of interest, and processing proceeds to step S109.

At step S109, the segmenter 22 adds the http header for the sample group of interest to the moof subset for the sample group of interest and the sample group of interest, and thereby generates an http response serving as a portion, and supplies the http response to the FLUTE streamer 24, and processing proceeds to step S110.

At step S110, as with step S105, the FLUTE streamer 24 packetizes the http response serving as a portion and supplied from the segmenter 22 into an LCT packet, and the multicast server 25 multicast-delivers the LCT packet, and processing proceeds to step S111.

At step S111, the segmenter 22 determines whether the sample group of interest is the last sample group of the fragment of interest.

If it is determined at step S111 that the sample group of interest is not the last sample group of the fragment of interest, i.e., if the fragment of interest has the next sample group to the sample group of interest, processing returns to step S106 and similar processes are repeated with the next sample group to the sample group of interest as a new sample group of interest.

In addition, if it is determined at step S111 that the sample group of interest is the last sample group of the fragment of interest, processing returns to step S101 and similar processes are repeated thereafter, for example, with the next fragment to the fragment of interest as a new fragment of interest.

<Content Reception in Portion Units>

Figure 15:
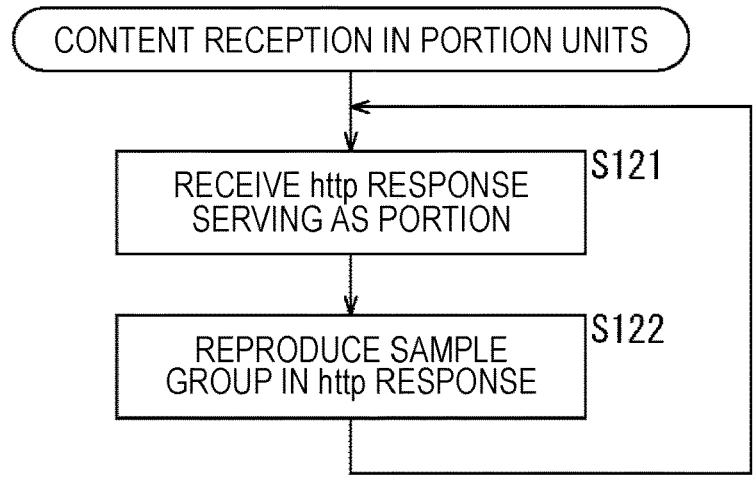
FIG. 15 is a flowchart describing an example of processes for content reception in portion units.

FIG. 15 is a flowchart describing an example of processes for content reception in portion units.

At step S121, the receiving unit 31 of the client 12 (FIG. 3) waits for an http response serving as a portion to be multicast-delivered, and receives the http response serving as a portion, and processing proceeds to step S122.

At step S122, the reproducing unit 33 reproduces a sample group included in the http response which serves as a portion and which is received by the receiving unit 31, using, as necessary, a moof subset included in the http response and a sequence number sqn, a version v, an NTP time nt, and a sample count start scs which are included in an http header of the http response.

Then, processing returns to step S121 from step S122 and similar processes are repeated thereafter.

As described above, the delivery server 11 delivers, without waiting for a segment to be generated and at a point in time of having generated a sample group which is part of a fragment included in the segment, an http response serving as a portion including the sample group. Thus, the delivery server 11 can promptly deliver content.

As a result, delay in content reception and start of buffering by the client 12 can be suppressed.

<LCT Packet>

Figure 16:
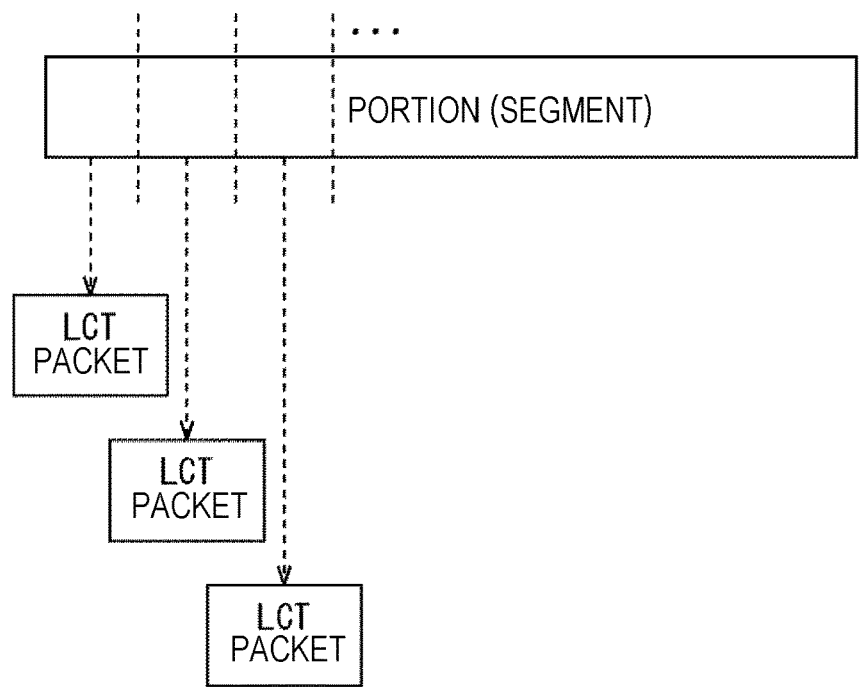
FIG. 16 is a diagram describing multicast delivery of a portion (and a segment) by use of LCT packets.

FIG. 16 is a diagram describing multicast delivery of a portion (and a segment) by use of LCT packets.

The FLUTE streamer 24 packetizes a portion (and a segment) into LCT packets, and the multicast server 25 multicast-delivers the LCT packets.

Packetization of a portion into LCT packets by the FLUTE streamer 24 is performed by, for example, as shown in FIG. 16, dividing a portion into one or more small pieces of a predetermined size and storing each small piece in an LCT packet.

Figure 17:
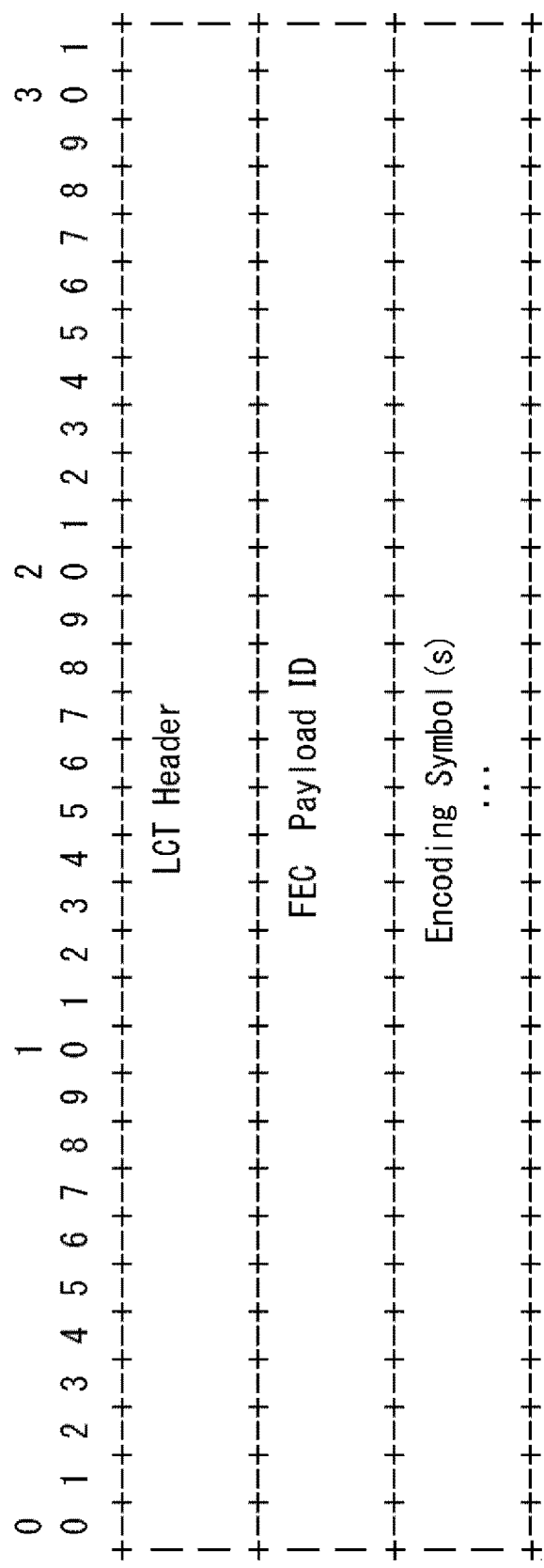
FIG. 17 is a diagram showing a format of an LCT packet.

FIG. 17 is a diagram showing a format of an LCT packet.

An LCT packet is constituted by LCT Header, FEC Payload ID, and Encoding Symbol(s) which are disposed in this order.

(A small piece of) a portion is stored as the Encoding Symbol(s) in the LCT packet.

Figure 18:
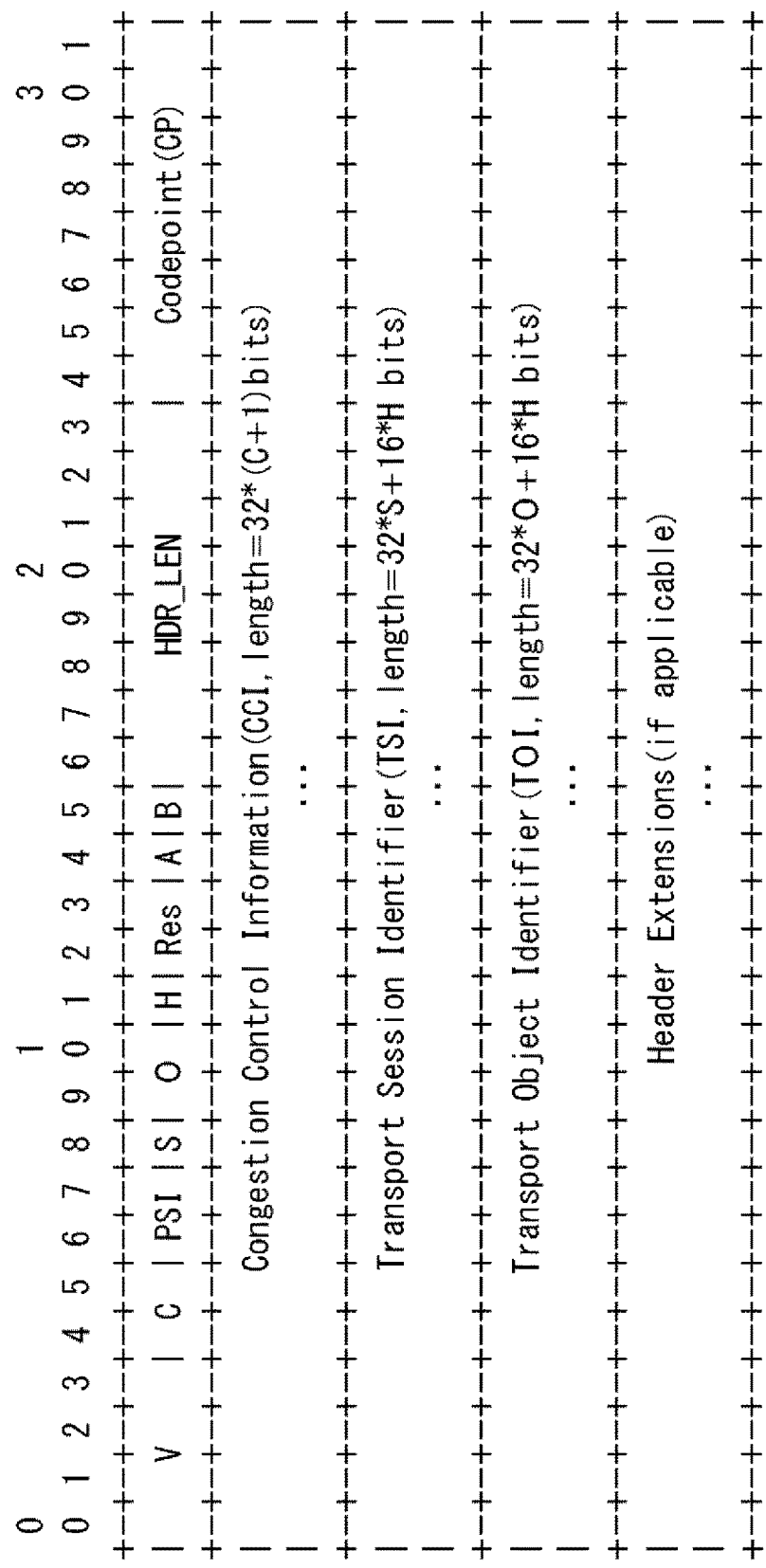
FIG. 18 is a diagram showing a format of an LCT header.

FIG. 18 is a diagram showing a format of the LCT header.

The LCT header includes Transport Session Identifier (TSI), Transport Object Identifier (TOI), and required Header Extensions.

The TSI is an identifier that identifies a session of the LCT packet. For example, the same value is set for the TSIs of LCT packets into which each of the portions 60, 70, and 80 including the sample groups 56, 57, and 58 is packetized, the sample groups 56, 57, and 58 originally supposed to be delivered in one segment 50 (FIG. 11).

The TOI is an identifier that identifies an object whose data is stored in the Encoding Symbol(s) of the LCT packet. For example, the same value is set for the TOIs of LCT packets that store, in the Encoding Symbol(s), small pieces into which the portion 60 is divided.

However, for example, an LCT packet that stores, in the Encoding Symbol(s), a small piece into which the portion 60 is divided and an LCT packet that stores, in the Encoding Symbol(s), a small piece into which the portion 70 is divided differ from each other in an object whose data (small piece) is stored in the Encoding Symbol(s), and thus, the portions 60 and 70 have different TOIs.

The client 12 receives LCT packets with the same TOI and thereby collects small pieces of a portion stored in the LCT packets and can thereby reconstitute the original portion.

Figure 19:
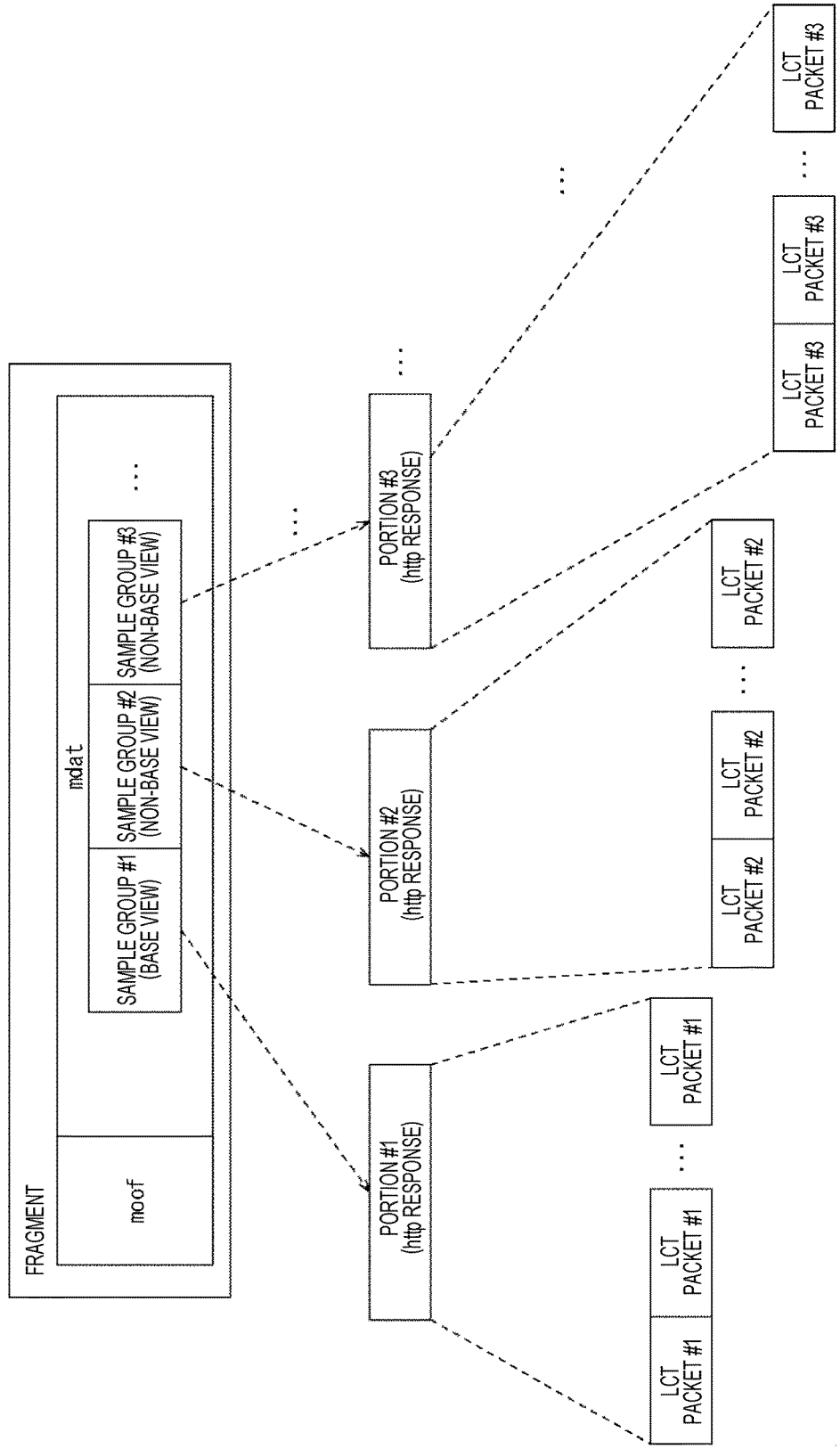
FIG. 19 is a diagram showing an example of content delivery in portion units.

FIG. 19 is a diagram showing an example of content delivery in portion units.

In FIG. 19, a given fragment includes sample groups #1, #2, . . . .

Then, the sample group #1 is, for example, base view (base layer/view) video that does not refer to other views, and the sample groups #2, #3, . . . are, for example, non-base view (enhancement layer/view) video that may refer to other views such as a base view.

In content delivery in portion units, the delivery server 11 generates a portion #i including a sample group #i (i=1, 2, 3 . . . ). Then, the portion #i is divided into small pieces, and the small pieces of the portion #i are stored in LCT packets #i and delivered.

Since the TOIs of LCT packets #i that store small pieces of a given portion #i have the same value, the client 12 receives LCT packets and collects small pieces of the portion #i stored in LCT packets with the same TOI among the received LCT packets, and can thereby reconstitute the original portion #i.

Here, as described above, in FIG. 19, the sample group #1 included in a portion #1 is base view video, and the sample groups #2, #3, . . . are non-base view video.

When, as described above, a sample group included in a portion is data (processing unit) that can be classified by some sort of criteria, such as base view video or non-base view video, packet filtering that selects LCT packets can be performed in units of (sample groups included in) portions.

Namely, when, for example, it is difficult to allocate sufficient resources (including the resources of the client 12 that finally receives LCT packets) to LCT packet delivery due to, for example, changes in a network environment where LCT packets are delivered, a router on an LCT packet's delivery path (e.g., a FLUTE-multicast router) or a network stack of the client 12 (a block that process LCT packets) can select only LCT packets that are minimum necessary or that have a high priority for processing, and perform processes (processes such as transferring and stacking).

Particularly, content delivery using, for example, a cellular network where there are lots of changes in a network environment highly demands a packet filtering technology where only minimum necessary LCT packets or LCT packets having a high priority for processing are selected and processed, such as that described above.

For a method for performing packet filtering that selects an LCT packet in portion units, there is a method in which an http header of a portion includes attribute information (e.g., FDT, etc.) of a sample group that indicates, for example, that the sample group included in the portion is, for example, base view video or non-base view video, and LCT packets that store (small pieces of) the portion including the sample group are selected on the basis of the attribute information of the sample group.

However, including, in an http header of a portion, attribute information of a sample group included in the portion requires reconstitution of the original portion from LCT packets every time packet filtering is performed in order to recognize the attribute information of the sample group. Thus, it becomes difficult to efficiently perform packet filtering.

Hence, in the delivery server 11, the FLUTE streamer 24 generates an LCT packet having an LCT header that includes priority parameters representing a priority for LCT packet processing, and the multicast server 25 can multicast-deliver such an LCT packet having an LCT header that includes priority parameters. In this case, efficient packet filtering can be performed and thus required LCT packets can be promptly delivered or processes.

<Priority Parameters>

In the present technology, the LCT header is extended so that priority parameters can be stored in the Header Extensions of the LCT header, by which priority parameters are included in the LCT header.

Figure 20:
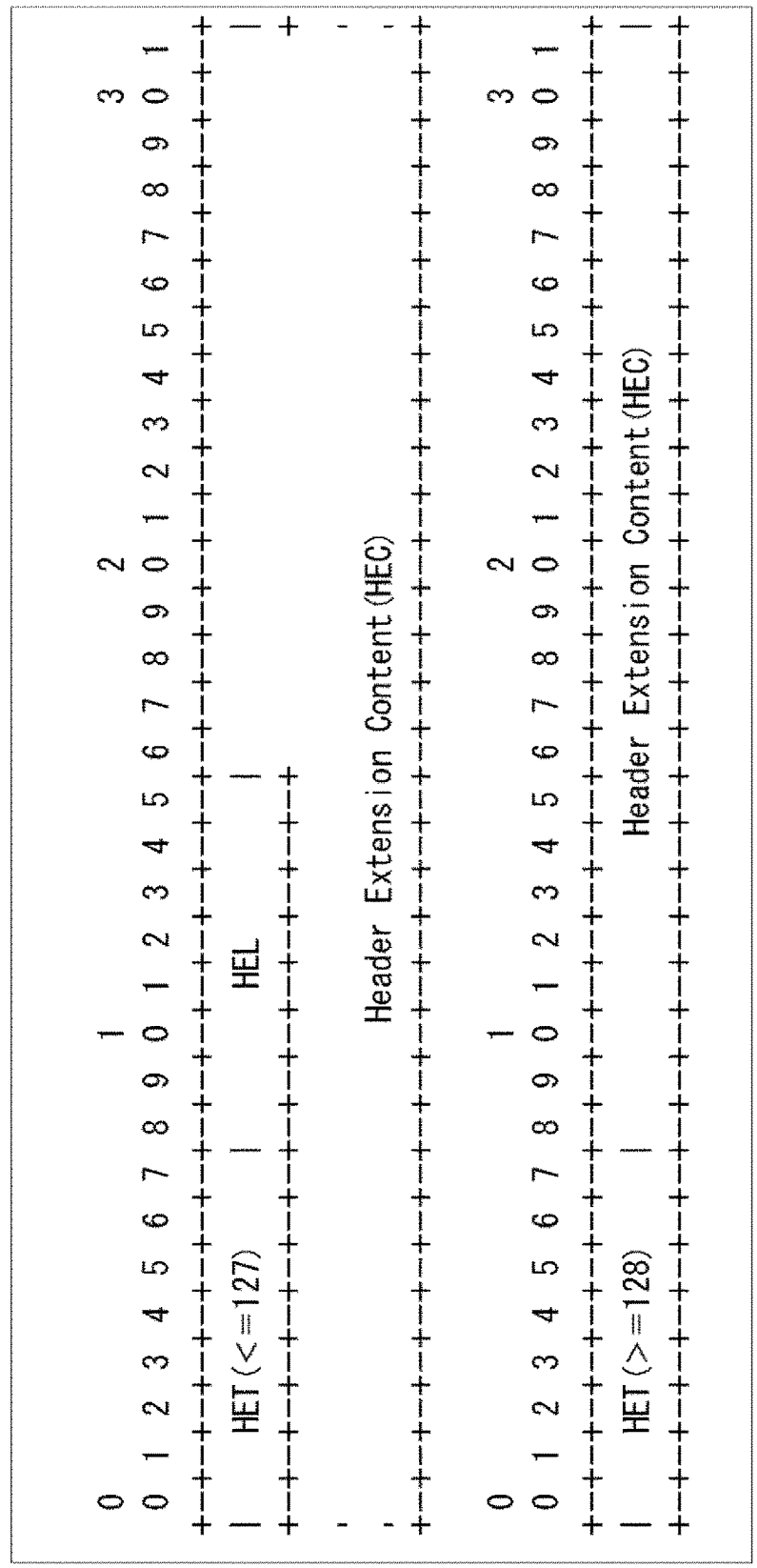
FIG. 20 is a diagram showing a format of Header Extensions of the LCT header.

FIG. 20 is a diagram showing a format of the Header Extensions of the LCT header of FIG. 18.

Header Extension Type (HET) representing the type of the Header Extensions (the type of actual data stored as HEC in the Header Extensions) is stored in the first 8 bits of the Header Extensions.

When the 8-bit HET is 127 or less, 8-bit Header Extension Length (HEL) is stored following the HET. In the HEL, a value N representing a length of the Header Extensions of 32×N bits is set.

Then, Header Extension Content (HEC) with a variable length of 32×N-8-8 bits is stored following the HEL. The HEC is the actual data of the Header Extensions.

On the other hand, when the 8-bit HET is 128 or more, 32-8-bit HEC is stored following the HET.

For the HET, some values are already specified, but in the present embodiment, a value that is not yet specified is adopted for the HET, by which new Header Extensions that store priority parameters are defined.

FIG. 21 is a diagram showing an example of definitions of new Header Extensions that store priority parameters.

New Header Extensions are constituted by 8-bit HET, 8-bit HEL, 8-bit Filtering Scheme URI, 8-bit Filtering Parameter Length, and 8×FPLN-bit Filtering Parameter which are disposed in this order.

The HET of the new Header Extensions is set to, for example, 120 as a value indicating that priority parameters are stored in the Header Extensions. In this case, since the HET is 127 or less, as shown in FIG. 20, the HEL is disposed following the HET.

The HEL is set to an integer value HELN in a range of 0 to 255. For the integer value HELN, a value where 32×HELN is the length of the Header Extensions is adopted.

The Filtering Scheme URI is a scheme identifier (SchemeURI) that defines the Filtering Parameter.

The Filtering Parameter Length is set to an integer value FPLN in a range of 0 to 255. For the integer value FPLN, a value where 32×FPLN is the length of the Filtering Parameter is adopted.

The Filtering Parameter is priority parameters, and the definitions (structure) thereof are identified by the Filtering Scheme URI.

FIG. 22 is a diagram showing an example of definitions of the priority parameters (Filtering Parameter).

For example, the Filtering Scheme URI=1000 represents the definitions of FIG. 22.

In FIG. 22, the priority parameters (Filtering Parameter) are 64 bits and constituted by 8-bit Track Reference Index, 8-bit Priority, 8-bit Dependency Counter, 8-bit MVC Filter Length, and 32-bit MVC Filter which are disposed in this order.

The Track Reference Index is set to a value that identifies a track (a track in an MP4 file) to which a sample group serving as part of a fragment and stored in the LCT packet (a sample group included in a portion whose small piece is stored in the LCT packet) belongs, among integer values in a range of 0 to 255.

According to the Track Reference Index serving as a priority parameter, for example, packet filtering can be performed where an LCT packet that stores a small piece of a portion including a sample group that belongs to a predetermined track is prioritarily selected and processed.

The Priority is set for each set of LCT packets with the same TOI. The Priority is set to an index representing a priority for processing of an LCT packet with each TOI value.

The index set for the Priority is an integer value in a range of 0 to 255 that ranks a priority for LCT packet processing. For example, the larger the value of the index, the lower the priority.

According to the Priority serving as a priority parameter, for example, packet filtering can be performed where an LCT packet having a TOI set with a Priority lower than or equal to a predetermined value is prioritarily selected and processed.

The Dependency Counter is set to the number K of subsequent LCT packets affected by the LCT packet including the Dependency Counter. In a case of Dependency Counter=K, processes for K LCT packets subsequent to an LCT packet with the Dependency Counter=K depend on processes for the LCT packet with the Dependency Counter=K.

According to the Dependency Counter serving as a priority parameter, for example, packet filtering can be performed where an LCT packet with a Dependency Counter of 1 or more, i.e., an LCT packet that affects its subsequent one or more LCT packets, is prioritarily selected and processed.

The MVC Filter Length takes a Boolean value and, when True, indicates that there is a subsequent MVC Filter.

The MVC Filter is information for performing filtering where, when a sample group included in a portion whose small piece is stored in the LCT packet is Multiview Video Coding (MVC) data, the MVC data is selected.

For the MVC Filter, for example, one or more of priority_id (PRID), temporal_id (TID), and View_id (VID) can be adopted which are defined as MVC Network Abstraction Layer (NAL) unit headers to be stored in an RTP packet.

FIG. 23 is a diagram showing an example of definitions of the MVC Filter.

The 32-bit MVC Filter is constituted by 6-bit priority_id (PRID), 3-bit temporal_id (TID), 10-bit view_id (VID), and 13-bit Reserved which are disposed in this order.

The PRID, TID, VID, and Reserved are defined as follows.

PRID: 6 bits priority_id. This flag specifies a priority identifier for the NAL unit. A lower value of PRID indicates a higher priority.

TID: 3 bits temporal_id. This component specifies the temporal layer (or frame rate) hierarchy. Informally put, a temporal layer consisting of view component with a less temporal_id corresponds to a lower frame rate.

A given temporal layer typically depends on the lower temporal layers (i.e. the temporal layers with less temporal_id values) but never depends on any higher temporal layer (i.e. temporal layers with higher temporal_id value).

VID: 10 bits view_id. This component specifies the view identifier of the view the NAL unit belongs to.

Reserved: 13 bits (Reserved Bits for Future Extension)

The PID represents a priority of a NAL unit (a NAL unit for when a sample group included in a portion whose small piece is stored in the LCT packet is a NAL unit). The smaller the PID, the higher the priority of the NAL unit.

The TID represents a temporal layer (or frame rate) of video (video for when a sample group included in a portion whose small piece is stored in the LCT packet is video (data)). A layer with a smaller TID has a lower frame rate. A given layer may depend on lower layers with smaller TIDs than the layer, but never depends on higher layers with larger TIDs.

The VID represents a view to which the NAL unit belongs.

The Reserved is reserved bits for future.

According to the MVC Filter such as that described above, for example, packet filtering can be performed where, when an LCT packet includes (a part of) a NAL unit serving as video, an LCT packet including a NAL unit with a high priority is prioritily selected and processed on the basis of the PID.

In addition, for example, packet filtering can be performed where an LCT packet including (a NAL unit of) video whose temporal layer is less than or equal to a predetermined layer, i.e., video whose frame rate serving as temporal resolution is less than or equal to a predetermined value, is prioritily selected and processed on the basis of the TID.

Furthermore, for example, packet filtering can be performed where an LCT packet including (a NAL unit of) video of a predetermined view is prioritily selected and processed on the basis of the VID.

In addition to the above, for priority parameters, various kinds of information can be adopted.

Specifically, for example, when an LCT packet includes video of either one of a moving image and a still image, information indicating that the video is a moving image or a still image can be adopted as a priority parameter. In this case, packet filtering can be performed where an LCT packet including video of a moving image or a still image is prioritily selected and processed.

In addition, for example, when an LCT packet includes video of any of a base layer that does not refer to other layers and one or more non-base layers that may refer to other layers, information indicating the video layer can be adopted as a priority parameter. In this case, for example, packet filtering can be performed where an LCT packet including base layer video is prioritily selected and processed.

Furthermore, for example, when an LCT packet includes video of any of a plurality of views, information indicating the video view can be adopted as a priority parameter. In this case, for example, packet filtering can be performed where an LCT packet including video of a view desired by a user (e.g., in baseball broadcast, video of a view shot from the backstop side among video of a plurality of views shot from a plurality of locations such as the first base side, the third base side, and the backstop side) is prioritily selected and processed.

In addition, for example, when an LCT packet includes video of any of a plurality of resolutions, information indicating the resolution can be adopted as a priority parameter. In this case, for example, packet filtering can be performed where an LCT packet including video of a predetermined resolution (or less) is prioritily selected and processed. For the information indicating the resolution and serving as a priority parameter, either one of a temporal resolution and a spatial resolution or both pieces of information can be adopted.

Note that packet filtering can be performed not only on the basis of one type of priority parameter, but also on a plurality of types of priority parameters.

Specifically, for example, in packet filtering, on the basis of, for example, information indicating a video view and information indicating a resolution which serve as priority parameters, an LCT packet including video of a predetermined view and a predetermined resolution can be prioritily selected and processed.

<Processes for Delivery of an LCT Packet Including a Priority Parameter>

Figure 24:
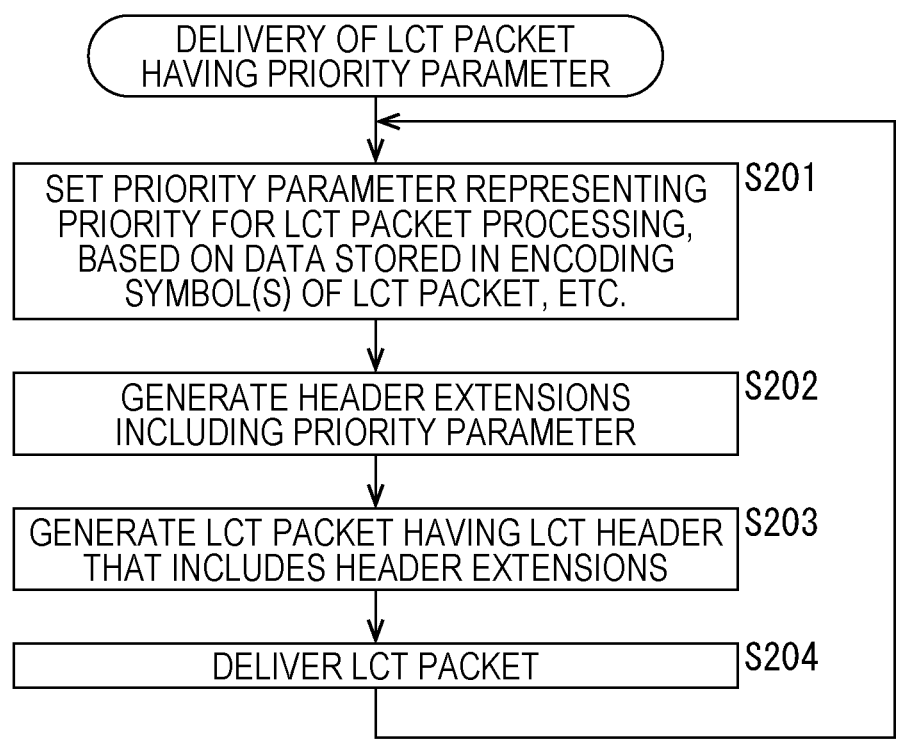
FIG. 24 is a flowchart describing an example of processes for delivery of an LCT packet including a priority parameter.

FIG. 24 is a flowchart describing an example of processes for delivery of an LCT packet including a priority parameter.

At step S201, the FLUTE streamer 24 of the delivery server 11 (FIG. 2) sets a priority parameter on the basis of data (a small piece of a portion supplied from the segmenter 22) stored in the Encoding Symbol(s) of an LCT packet (FIG. 17), operations by an operator of the delivery server 11, etc., and processing proceeds to step S202.

At step S202, the FLUTE streamer 24 generates Header Extensions including the priority parameter set at step S201 (FIG. 21) (FIG. 22), and processing proceeds to step S203.

At step S203, the FLUTE streamer 24 generates an LCT packet (FIG. 17) that has an LCT header including the Header Extensions generated at step S202 (FIG. 18) and that has the small piece of the portion supplied from the segmenter 22 and disposed in the Encoding Symbol(s), and supplies the LCT packet to the multicast server 25, and processing proceeds to step S204.

At step S204, the multicast server 25 multicast-delivers the LCT packet supplied from the FLUTE streamer 24, and processing returns to step S201 and similar processes are repeated thereafter.

<Processes for Packet Filtering>

Figure 25:
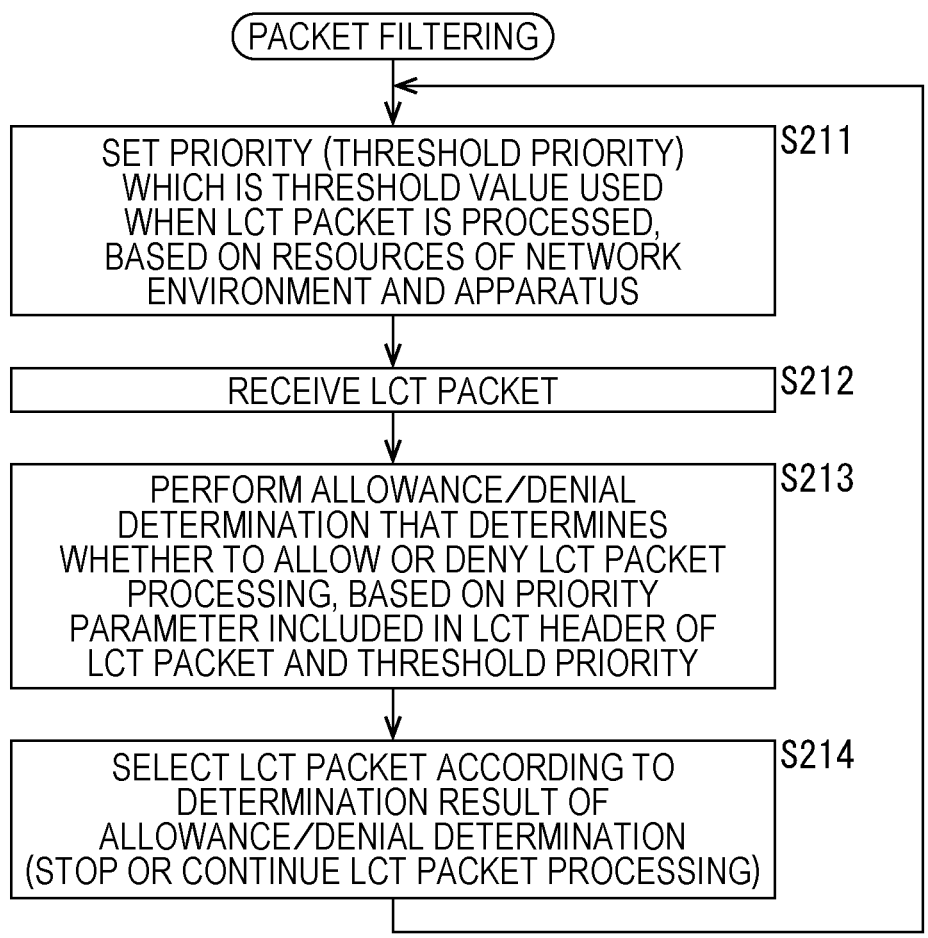
FIG. 25 is a flowchart describing an example of processes for packet filtering performed by the client 12.

FIG. 25 is a flowchart describing an example of processes for packet filtering performed by the client 12 (other apparatuses that receive an LCT packet which is multicast-delivered, such as a router).

At step S211, the receiving unit 30 of the client 12 (FIG. 3) sets a priority which is a threshold value used when an LCT packet is processed (hereinafter, also referred to as threshold priority), on the basis of the resources of a network environment and the apparatus (client 12), user's operations, user's preferences, etc., and processing proceeds to step S212.

At step S212, the receiving unit 30 waits for an LCT packet to be multicast-delivered and receives the LCT packet, and processing proceeds to step S213.

At step S213, the receiving unit 30 performs an allowance/denial determination that determines whether to allow or deny LCT packet processing, on the basis of a priority parameter included in an LCT header of the LCT packet received at step S212 and the threshold priority set at step S211, and processing proceeds to step S214.

At step S214, the receiving unit 30 selects the LCT packet according to a determination result of the allowance/denial determination at step S213, by which processing is stopped for an LCT packet having a priority parameter with a priority lower than the threshold priority, and processing is continued for an LCT having a priority parameter with a priority higher than or equal to the threshold priority. Then, processing returns to step S211 from step S214 and similar processes are repeated thereafter.

<Decoding-Related Information>

FIG. 26 is a diagram showing an example of definitions of new Header Extensions of an LCT header that store decoding-related information.

Here, upon decoding (including rendering (display)) a sample group that is included in an http response serving as a portion stored in the Encoding Symbol(s) of an LCT packet, first of all, information is required such as a decoding time and a composition time (display time) which are included in a moof, and a sequence number sqn, a version v, an NTP time nt, and a sample count start scs which are included in an http header.

Note that the information required to decode a sample group such as that described above, e.g., a decoding time, a composition time, a sequence number sqn, a version v, an NTP time nt, and a sample count start scs, is also referred to as decoding-related information.

The decoding-related information can be used, for example, for packet filtering of an LCT packet, as with the above-described priority parameters.

In addition, the decoding-related information can be used for preprocessing, so to speak, of decoding of a sample group, e.g., determination of processing order of processing a sample group that is included in an http response serving as a portion stored in the Encoding Symbol(s) of an LCT packet.

Meanwhile, in the above-described case, decoding-related information, such as a moof subset including a decoding time and a composition time and a sequence number sqn, a version v, an NTP time nt, and a sample count start scs, is included in an http response serving as a portion stored in the Encoding Symbol(s) of an LCT packet.

Therefore, to perform packet filtering of an LCT packet or perform preprocessing of decoding using decoding-related information, there is a need to analyze the LCT packet and extract decoding-related information from an http response serving as a portion stored in the Encoding Symbol(s) of the LCT packet.

However, analyzing an LCT packet to extract decoding-related information requires time, which hinders efficient packet filtering or prompt processes for a required LCT packet.

Hence, in the delivery server 11, the FLUTE streamer 24 generates an LCT packet having an LCT header that includes decoding-related information, and the multicast server 25 multicast-delivers such an LCT packet having an LCT header that includes decoding-related information, by which efficient packet filtering or prompt processes for a required LCT packet can be performed.

In the present technology, to generate an LCT packet having an LCT header that includes decoding-related information, as with the above-described case of generating an LCT packet having an LCT header that includes priority parameters, a value that is not yet specified is adopted for HET, by which new Header Extensions that store decoding-related information are defined.

Specifically, new Header Extensions that store decoding-related information are constituted by, for example, as shown in FIG. 26, 8-bit HET, 8-bit HEL, 64-bit NTPTimeStamp, 16-bit MoofSequenceNumber, 16-bit MoofVersion, 16-bit SampleCountStart, 8-bit Partial moof Length, and 8×FPLN-bit Partial moof which are disposed in this order.

The HET of the new Header Extensions is set to, for example, 101 as a value indicating that decoding-related information is stored in the Header Extensions. In this case, since the HET is 127 or less, as shown in FIG. 20, the HEL is disposed following the HET.

The HEL is set to an integer value HELN in a range of 0 to 255. For the integer value HELN, a value where 32×HELN is the length of the Header Extensions is adopted.

The NTPTimeStamp, MoofSequenceNumber, MoofVersion, and SampleCountStart are set to an NTP time nt, a sequence number sqn, a version v, and a sample count start scs, respectively, which are stored in an http header of an http response serving as a portion stored in an LCT packet.

The Partial moof Length is set to an integer value PMLN in a range of 0 to 255. For the integer value PMLN, a value where 32×PMLN is the length of the Partial moof is adopted.

The Partial moof is set to a (binary) moof subset stored in a message body of the http response serving as a portion stored in the LCT packet.

Here, in the following, for simplification of description, a portion is stored in the Encoding Symbol(s) of an LCT packet without being divided.

Note that when a portion is stored in the Encoding Symbol(s) of an LCT packet so as to be divided into a plurality of small pieces, for example, the same decoding-related information is stored in the Header Extensions of LCT packets that respectively store small pieces into which one portion is divided.

<First Example of an LCT Packet that Stores Decoding-Related Information in Header Extensions>

Figure 27:
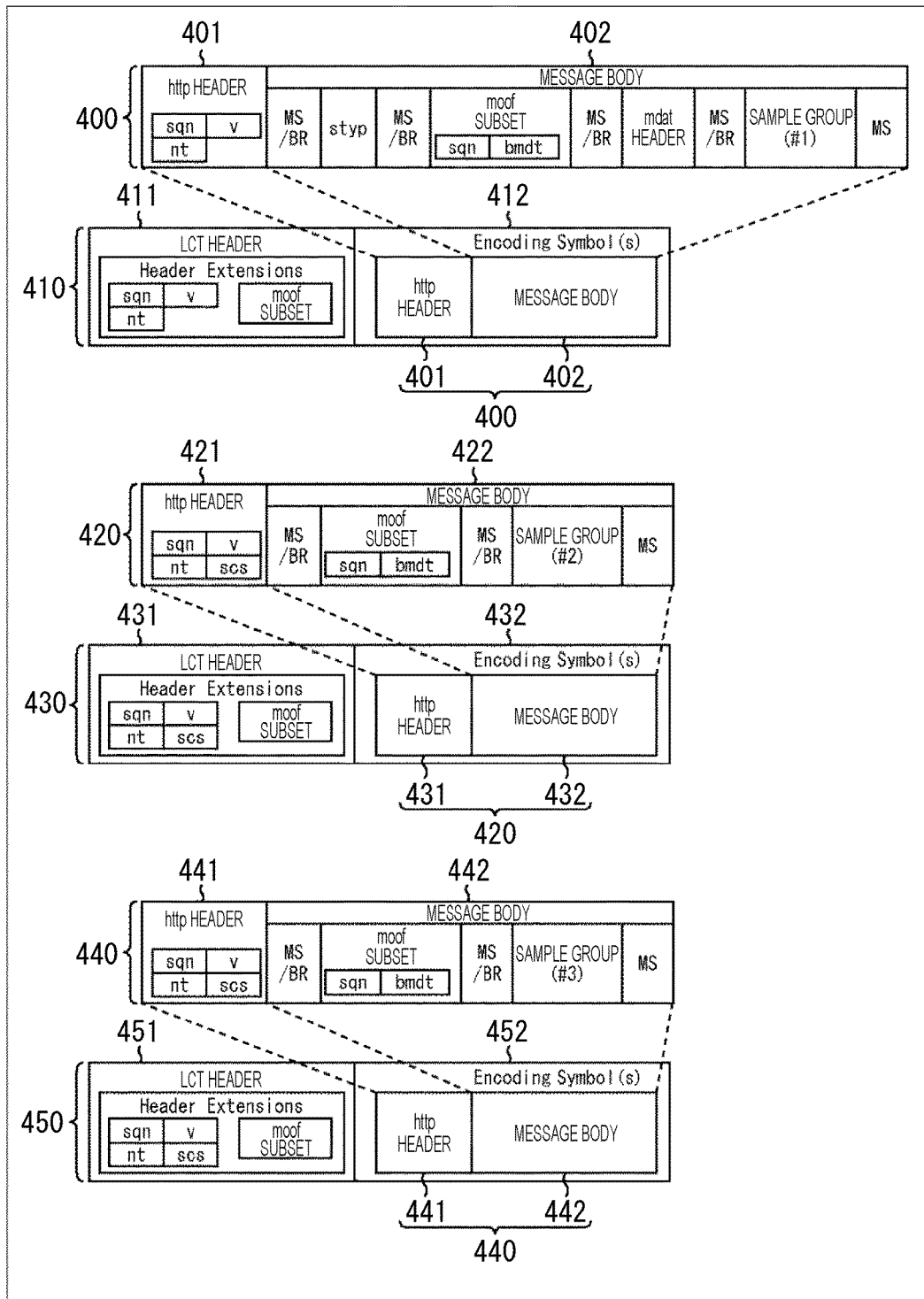
FIG. 27 is a diagram showing a first example of an LCT packet that stores decoding-related information in the Header Extensions.

FIG. 27 is a diagram showing a first example of an LCT packet that stores decoding-related information in Header Extensions.

In FIG. 27, as with the case of FIG. 11, http responses 400, 420, and 440 serving as three portions are generated from one fragment.

Furthermore, in FIG. 27, LCT packets that store the http responses 400, 420, and 440 in the Encoding Symbols(s), respectively, are generated from the http responses 400, 420, and 440.

The http response 400 serving as the first portion among the three portions generated from one fragment is configured in a similar manner as an http response serving as the portion 60 that includes the first (initial) sample group 56 in B of FIG. 11.

Specifically, the http response 400 includes an http header 401 and a message body 402.

As with the http header 61 of the http response serving as the portion 60 in B of FIG. 11, the http header 401 includes a sequence number sqn, a version v, and an NTP time nt.

As with the message body of the http response serving as the portion 60 in B of FIG. 11 (a portion after the http header 61 in B of FIG. 11), the message body 402 is constituted by an MS/BR, a styp, a moof subset, an MS/BR, an mdat header, an MS/BR, a sample group #1 corresponding to the first sample group 56, and an MS which are disposed in this order.

The FLUTE streamer 24 (FIG. 2) recognizes the sequence number sqn, version v, and NTP time nt included in the http header 401 and the moof subset included in the message body 402, by referring to the http response 400 serving as a portion and supplied from the segmenter 22, and stores the sequence number sqn, version v, NTP time nt, and moof subset in Header Extensions of an LCT header 411.

Furthermore, the FLUTE streamer 24 stores, in Encoding Symbol(s) 412, the http response 400 serving as a portion and adds the Encoding Symbol(s) 412 to the LCT header 411, and thereby generates an LCT packet 410.

The http response 420 serving as the second portion among the three portions generated from one fragment is configured in a similar manner as an http response serving as the portion 70 that includes the second sample group 57 in C of FIG. 11.

Specifically, the http response 420 includes an http header 421 and a message body 422.

As with the http header 71 of the http response serving as the portion 70 in C of FIG. 11, the http header 421 includes a sequence number sqn, a version v, an NTP time nt, and a sample count start scs.

As with the message body of the http response serving as the portion 70 in C of FIG. 11 (a portion after the http header 71 in C of FIG. 11), the message body 422 is constituted by an MS/BR, a moof subset, an MS/BR, a sample group #2 corresponding to the second sample group 57, and an MS which are disposed in this order.

The FLUTE streamer 24 (FIG. 2) recognizes the sequence number sqn, version v, NTP time nt, and sample count start scs included in the http header 421 and the moof subset included in the message body 422, by referring to the http response 420 serving as a portion and supplied from the segmenter 22, and stores the sequence number sqn, version v, NTP time nt, sample count start scs, and moof subset in Header Extensions of an LCT header 431.

Furthermore, the FLUTE streamer 24 stores, in Encoding Symbol(s) 432, the http response 420 serving as a portion and adds the Encoding Symbol(s) 432 to the LCT header 431, and thereby generates an LCT packet 430.

The http response 440 serving as the third portion among the three portions generated from one fragment is configured in a similar manner as an http response serving as the portion 80 that includes the third (last) sample group 58 in D of FIG. 11.

Specifically, the http response 440 includes an http header 441 and a message body 442.

As with the http header 81 of the http response serving as the portion 80 in D of FIG. 11, the http header 441 includes a sequence number sqn, a version v, an NTP time nt, and a sample count start scs.

As with the message body of the http response serving as the portion 80 in D of FIG. 11 (a portion after the http header 81 in D of FIG. 11), the message body 442 is constituted by an MS/BR, a moof subset, an MS/BR, a sample group #3 corresponding to the third sample group 58, and an MS which are disposed in this order.

Here, the moof subset included in the message body 442 is a moof subset that can be generated until generating the third sample group #3 included in the message body 442, i.e., the last sample group #3 in the one original fragment from which are generated the http responses 400, 420, and 440 serving as three portions, and thus is equal to a moof for all sample groups #1 to #3 included in the original fragment.

The FLUTE streamer 24 (FIG. 2) recognizes the sequence number sqn, version v, NTP time nt, and sample count start scs included in the http header 441 and the moof subset included in the message body 442, by referring to the http response 440 serving as a portion and supplied from the segmenter 22, and stores the sequence number sqn, version v, NTP time nt, sample count start scs, and moof subset in Header Extensions of an LCT header 451.

Furthermore, the FLUTE streamer 24 stores, in Encoding Symbol(s) 452, the http response 440 serving as a portion and adds the Encoding Symbol(s) 452 to the LCT header 451, and thereby generates an LCT packet 450.

According to an LCT packet including, in an LCT header, a moof subset, a sequence number sqn, a version v, an NTP time nt, and a sample count start scs which are decoding-related information, such as that described above, content delivery in portion units is also performed and thus content can be promptly delivered.

Furthermore, since a moof subset, a sequence number sqn, a version v, an NTP time nt, and a sample count start scs which are decoding-related information are collectively stored in (the Header Extensions of) an LCT header, computation of time (calendar time) required to decode a sample group can be efficiently performed using the decoding-related information which is collectively stored in the LCT header.

In addition, since a moof subset, a sequence number sqn, a version v, an NTP time nt, and a sample count start scs which are decoding-related information are disposed (stored) (set) in a predetermined location of the binary Header Extensions of an LCT header, by referring to the binary Header Extensions, packet filtering that selects (a portion stored in the Encoding Symbol(s) of) an LCT packet is efficiently performed on the basis of the sequence number sqn, version v, a BaseMediaDecodeTime (bmdt) which is included in the moof subset, etc., enabling prioritarily and promptly process a required LCT packet.

Figure 28:
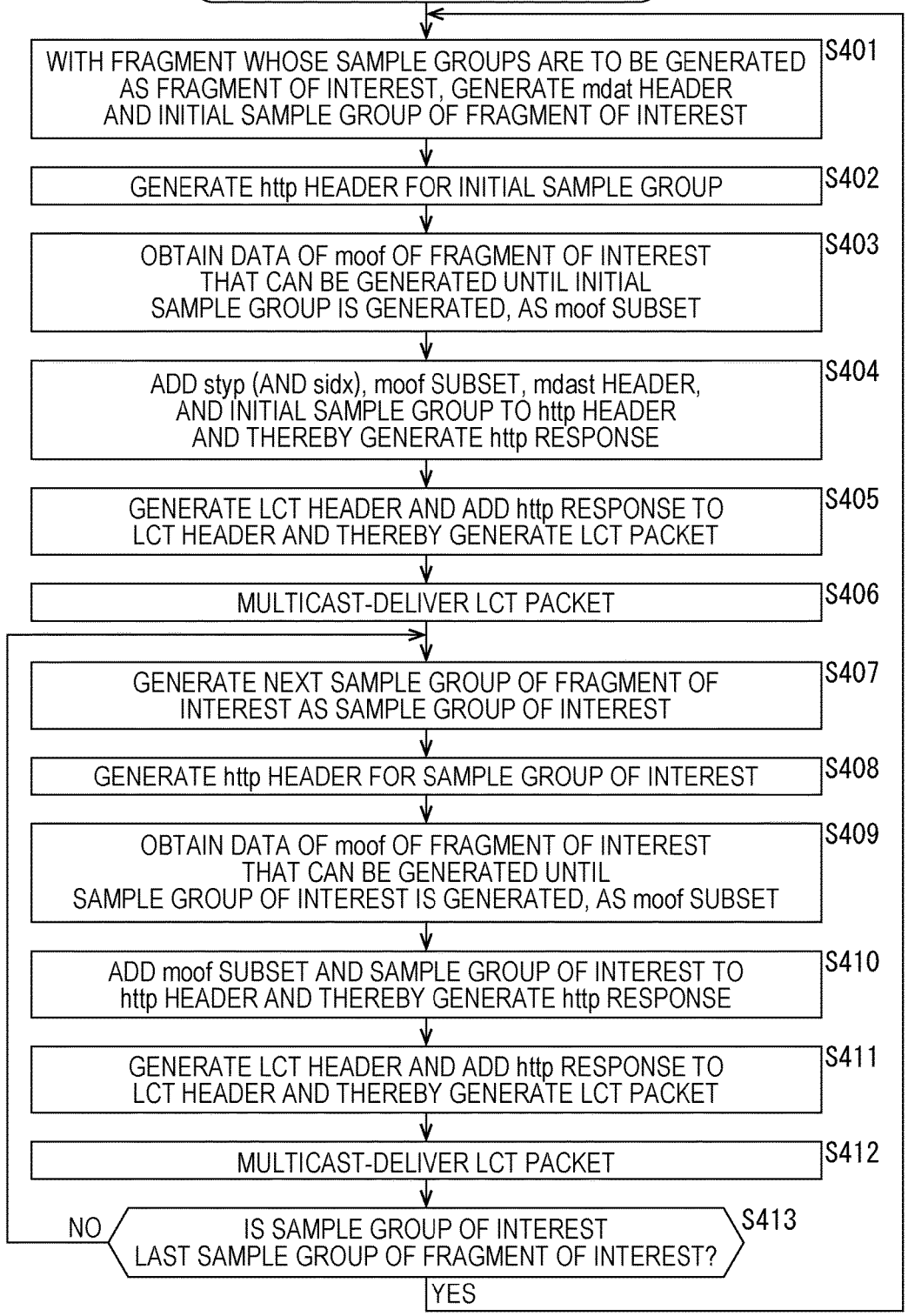
FIG. 28 is a flowchart describing an example of processes for content delivery in portion units by use of LCT packets of the first example.

FIG. 28 is a flowchart describing an example of processes for content delivery in portion units by use of LCT packets of the first example of FIG. 27.

At steps S401 to S404, the delivery server 11 performs similar processes as to those at steps S101 to S104 of FIG. 14. By this, the segmenter 22 (FIG. 2) generates an http response serving as a portion that includes an initial sample group of a fragment of interest, and supplies the http response to the FLUTE streamer 24, and processing proceeds to step S405.

At step S405, the FLUTE streamer 24 recognizes decoding-related information (a moof subset, a sequence number sqn, a version v, and an NTP time nt) from the http response serving as a portion and supplied from the segmenter 22, and generates an LCT header that stores the decoding-related information.

Furthermore, at step S405, the FLUTE streamer 24 adds, as Encoding symbol (s), the http response supplied from the segmenter 22 and serving as a portion to the LCT header that stores the decoding-related information, and thereby generates an LCT packet and supplies the LCT packet to the multicast server 25, and processing proceeds to step S406.

At step S406, the multicast server 25 multicast-delivers the LCT packet supplied from the FLUTE streamer 24, and processing proceeds to step S407.

At steps S407 to S410, the delivery server 11 performs similar processes as to those at steps S106 to S109 of FIG. 14. By this, with the next sample group of the fragment of interest as a sample group of interest, the segmenter 22 generates an http response serving as a portion that includes the sample group of interest, and supplies the http response to the FLUTE streamer 24, and processing proceeds to step S411.

At step S411, the FLUTE streamer 24 recognizes decoding-related information (a moof subset, a sequence number sqn, a version v, an NTP time nt, and a sample count start scs) from the http response serving as a portion and supplied from the segmenter 22, and generates an LCT header that stores the decoding-related information.

Furthermore, at step S411, the FLUTE streamer 24 adds, as Encoding symbol (s), the http response supplied from the segmenter 22 and serving as a portion to the LCT header that stores the decoding-related information, and thereby generates an LCT packet and supplies the LCT packet to the multicast server 25, and processing proceeds to step S412.

At step S412, the multicast server 25 multicast-delivers the LCT packet supplied from the FLUTE streamer 24, and processing proceeds to step S413.

At step S413, the segmenter 22 determines whether the sample group of interest is the last sample group of the fragment of interest.

If it is determined at step S413 that the sample group of interest is not the last sample group of the fragment of interest, i.e., if the fragment of interest has the next sample group to the sample group of interest, processing returns to step S407 and similar processes are repeated with the next sample group to the sample group of interest as a new sample group of interest.

In addition, if it is determined at step S413 that the sample group of interest is the last sample group of the fragment of interest, processing returns to step S401 and similar processes are repeated thereafter, for example, with the next fragment to the fragment of interest as a new fragment of interest.

Figure 29:
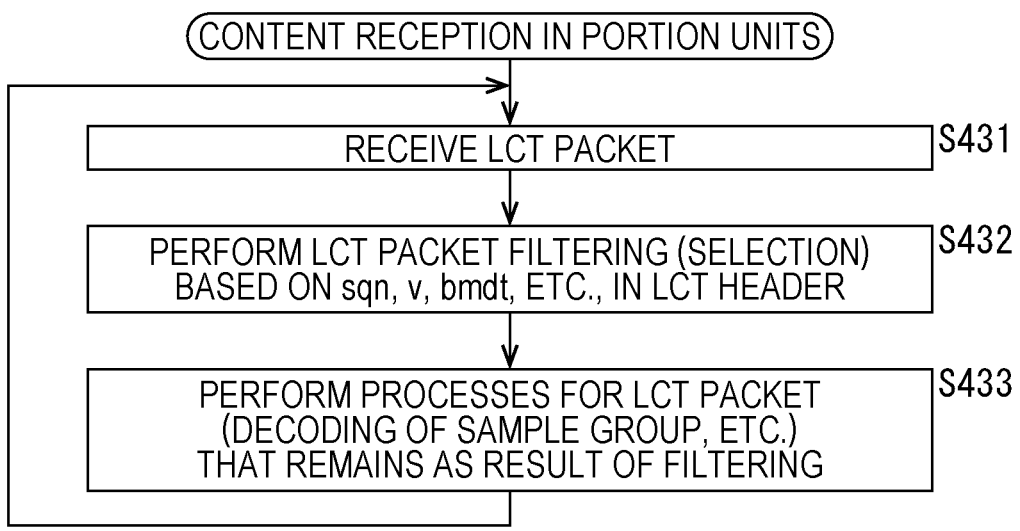
FIG. 29 is a flowchart describing an example of processes for reception of content that is delivered in portion units by use of LCT packets of the first example.

FIG. 29 is a flowchart describing an example of processes for reception of content that is delivered in portion units by use of LCT packets of the first example of FIG. 27.

At step S431, the receiving unit 30 of the client 12 (FIG. 3) waits for an LCT packet to be multicast-delivered and receives the LCT packet, and processing proceeds to step S432.

At step S432, the receiving unit 30 performs packet filtering that selects the LCT packet, on the basis of decoding-related information ((a bmdt, etc., included in) a moof subset, a sequence number sqn, a version v, an NTP time nt, and a sample count start scs) included in an LCT header of the LCT packet received at step S431, etc., and processing proceeds to step S433.

At step S433, the receiving unit 30 performs processes such as decoding of a sample group stored in an LCT packet that remains as a result of the packet filtering, using, as necessary, decoding-related information included in an LCT header of the LCT packet. Then, processing returns to step S431 from step S433 and similar processes are repeated thereafter.

<Second Example of an LCT Packet that Stores Decoding-Related Information in Header Extensions>

Figure 30:
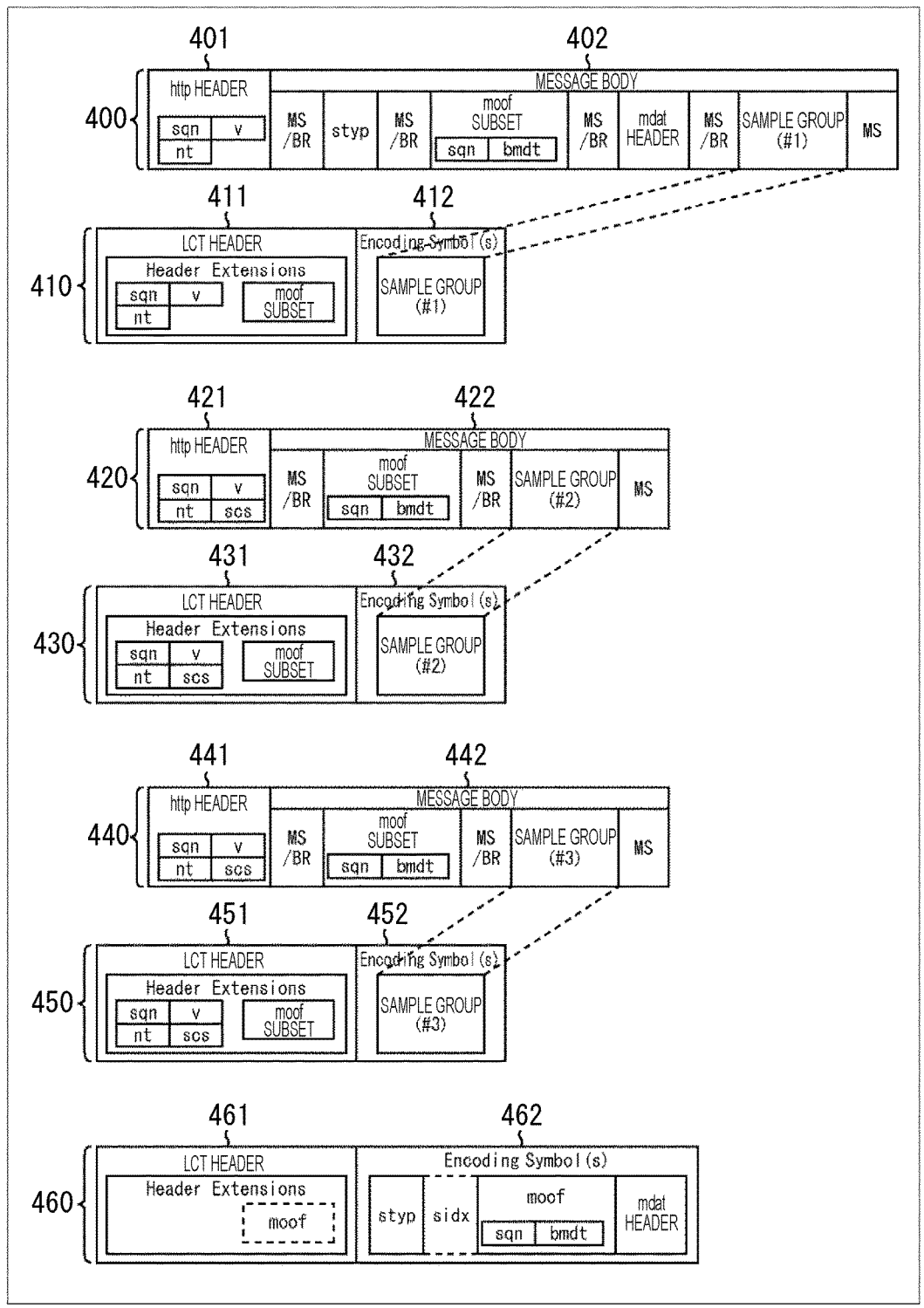
FIG. 30 is a diagram showing a second example of an LCT packet that stores decoding-related information in Header Extensions.

FIG. 30 is a diagram showing a second example of an LCT packet that stores decoding-related information in Header Extensions.

Note that in the drawing, corresponding portions to those of the case of FIG. 27 are denoted by the same reference symbols and description thereof is omitted below as appropriate.

In FIG. 30, the FLUTE streamer 24 generates, as an LCT packet 410, an LCT packet that stores, in Encoding Symbol(s), only a sample group #1 which is included in the http response 400, instead of the http response 400.

Likewise, the FLUTE streamer 24 generates, as an LCT packet 430, an LCT packet that stores, in Encoding Symbol(s), only a sample group #2 which is included in the http response 420, instead of the http response 420. Furthermore, likewise, the FLUTE streamer 24 generates, as an LCT packet 450, an LCT packet that stores, in Encoding Symbol(s), only a sample group #3 which is included in the http response 440, instead of the http response 440.

Therefore, since an LCT packet of the second example does not store an http header, a moof subset, etc., in Encoding Symbol(s), the overhead of transferring, receiving, and stacking processes can be reduced compared to an LCT packet of the first example.

Note that although in FIG. 30, for easy description, with an http message as a portion, an LCT packet that is compared with the http message serving as a portion is shown, an LCT packet of the second example of FIG. 30 can be generated using (one of) sample groups, a moof, an mdat header, etc., included in a fragment, as they are, as a portion.

Specifically, it is assumed that one segment is constituted by, for example, as shown in A of FIG. 11, a styp (and a required sidx) and one fragment, and the one fragment includes a moof, an mdat header, and three sample groups #1 to #3.

In this case, the segmenter 22 (FIG. 2) supplies each of the sample groups #1 to #3 which are a part of one fragment, as a portion to the FLUTE streamer 24, and the FLUTE streamer 22 generates LCT packets 410, 430, and 450 that store the sample groups #1 to #3 serving as portions and supplied from the segmenter 22, in Encoding Symbol(s) 412, 432, and 452, respectively.

Furthermore, when the segmenter 22 has generated all sample groups #1 to #3 to be included in one fragment and generated a moof for the sample groups #1 to #3, the segmenter 22 finally supplies, for the one fragment, an mdat header and a moof that serve as a part of the one fragment and a styp (and a required sidx) included in a segment that includes the one fragment, as a portion to the FLUTE streamer 24.

The FLUTE streamer 22 generates an LCT packet 460 that stores, in Encoding Symbol(s) 462, the mdat header, moof, and styp (and a required sidx) serving as a portion and supplied from the segmenter 22.

Note that the moof for the sample groups #1 to #3 can be stored not only in the Encoding Symbol(s) 462 of the LCT packet 460, but also in (Partial moof in Header Extensions (FIG. 26) of) an LCT header 461 of the LCT packet 460.

In addition, the moof for the sample groups #1 to #3 can be stored only in the LCT header 461 instead of in the Encoding Symbol(s) 462.

FIG. 31 is a flowchart describing an example of processes for content delivery in portion units by use of LCT packets of the second example of FIG. 30.

At step S451, with a fragment whose sample groups are to be generated (e.g., the fragment 52 of FIG. 11) as a fragment of interest, the segmenter 22 of the delivery server 11 (FIG. 2) generates an mdat header of the fragment of interest, and supplies the mdat header as (a part of) a portion to the FLUTE streamer 24.

Furthermore, at step S451, the segmenter 22 generates an initial sample group of the fragment of interest and supplies the initial sample group as a portion to the FLUTE streamer 24, and processing proceeds to step S452.

At step S452, the segmenter 22 generates decoding-related information for the initial sample group serving as a portion, i.e., the same sequence number sqn as a sequence number stored in a moof of the fragment of interest, a version v of 1 representing the position of the initial sample group in the fragment of interest, and an NTP time nt corresponding to a bmdt stored in the moof of the fragment of interest, and supplies the decoding-related information to the FLUTE streamer 24.

Furthermore, at step S452, the segmenter 22 obtains part of the moof of the fragment of interest that is required to reproduce the initial sample group and that could be generated until the initial sample group is generated, as a moof subset for the initial sample group, and supplies the moof subset to the FLUTE streamer 24, and processing proceeds to step S453.

At step S453, the FLUTE streamer 24 generates an LCT header that stores the decoding-related information supplied from the segmenter 22, i.e., the moof subset, sequence number sqn, version v, and NTP time nt.

Furthermore, at step S453, the FLUTE streamer 24 adds, as Encoding Symbol(s), the initial sample group supplied from the segmenter 22 and serving as a portion to the LCT header storing the decoding-related information, and thereby generates an LCT packet (an LCT packet corresponding to the LCT packet 410 of FIG. 30) and supplies the LCT packet to the multicast server 25, and processing proceeds to step S454.

At step S454, the multicast server 25 multicast-delivers the LCT packet supplied from the FLUTE streamer 24, and processing proceeds to step S455.

At step S455, the segmenter 22 generates the next sample group of the fragment of interest as a sample group of interest, and supplies the sample group of interest as a portion to the FLUTE streamer 24, and processing proceeds to step S456.

At step S456, the segmenter 22 generates decoding-related information for the sample group of interest serving as a portion, i.e., the same sequence number sqn as the sequence number stored in the moof of the fragment of interest, a version v representing the position of the sample group of interest in the fragment of interest, an NTP time nt corresponding to the bmdt stored in the moof of the fragment of interest, and a sample count start scs representing the sample number of the first sample in the sample group of interest, and supplies the decoding-related information to the FLUTE streamer 24.

Furthermore, at step S456, the segmenter 22 obtains part of the moof of the fragment of interest that is required to reproduce the sample group of interest (and the sample group generated until the sample group of interest of the fragment of interest is generated) and that could be generated until the sample group of interest is generated, as a moof subset for the sample group of interest, and supplies the moof subset to the FLUTE streamer 24, and processing proceeds to step S457.

At step S457, the FLUTE streamer 24 generates an LCT header that stores the decoding-related information supplied from the segmenter 22, i.e., the moof subset, sequence number sqn, version v, NTP time nt, and sample count start scs.

Furthermore, at step S457, the FLUTE streamer 24 adds, as Encoding Symbol(s), the sample group of interest supplied from the segmenter 22 and serving as a portion to the LCT header storing the decoding-related information, and thereby generates an LCT packet (an LCT packet corresponding to the LCT packet 430 or 450 of FIG. 39) and supplies the LCT packet to the multicast server 25, and processing proceeds to step S458.

At step S458, the multicast server 25 multicast-delivers the LCT packet supplied from the FLUTE streamer 24, and processing proceeds to step S459.

At step S459, the segmenter 22 determines whether the sample group of interest is the last sample group of the fragment of interest.

If it is determined at step S459 that the sample group of interest is not the last sample group of the fragment of interest, i.e., if the fragment of interest has the next sample group to the sample group of interest, processing returns to step S455 and similar processes are repeated with the next sample group to the sample group of interest as a new sample group of interest.

In addition, if it is determined at step S459 that the sample group of interest is the last sample group of the fragment of interest, processing proceeds to step S460 and the FLUTE streamer 24 obtains a styp (and a required sidx) of a segment that includes the fragment of interest from the segmenter 22.

Furthermore, the FLUTE streamer 24 generates an LCT packet (an LCT packet corresponding to the LCT packet 460 of FIG. 30) that stores, in Encoding Symbol(s), the mdat header supplied from the segmenter 22, the moof subset which is generated until the generation of the last sample group of the fragment of interest and which is supplied from the segmenter 22, i.e., the moof for all sample groups of the fragment of interest, and the styp (and a required sidx) obtained from the segmenter 22, and supplies the LCT packet to the multicast server 25, and processing proceeds to step S461.

At step S461, the multicast server 25 multicast-delivers the LCT packet supplied from the FLUTE streamer 24.

Thereafter, processing returns to step S451 from step S461 and similar processes are repeated thereafter, for example, with the next fragment to the fragment of interest as a new fragment of interest.

Note that the processes for content reception using LCT packets of the second example of FIG. 30 are similar to the processes for content reception using LCT packets of the first example which are described in FIG. 29 and thus description thereof is omitted.

<Description of a Computer to which the Present Technology is Applied>

Next, the above-described series of processes can be performed by hardware and can be performed by software.

When the series of processes are performed by software, a program that forms the software is installed on a general-purpose computer, etc.

Hence, FIG. 32 shows an exemplary configuration of one embodiment of a computer on which is installed a program that performs the above-described series of processes.

The program can be recorded in advance in a hard disk 305 or a ROM 303 which serves as a recording medium included in the computer.

Alternatively, the program can be stored (recorded) in a removable recording medium 311. Such a removable recording medium 311 can be provided as so-called packaged software. Here, examples of the removable recording medium 311 include a flexible disk, a Compact Disc Read Only Memory (CD-ROM), a Magneto Optical (MO) disk, a Digital Versatile Disc (DVD), a magnetic disk, and a semiconductor memory.

Note that the program can be installed not only on a computer from the removable recording medium 311 such as those described above, but also on the hard disk 305 included in the computer by downloading the program to the computer through a communication network or a broadcast network. Namely, the program can be, for example, wirelessly transferred to the computer from a download site through an artificial satellite for digital satellite broadcasting, or transferred by wire to the computer from a download site through a network such as a Local Area Network (LAN) or the Internet.

The computer includes a Central Processing Unit (CPU) 302. An input/output interface 310 is connected to the CPU 302 through a bus 301.

When a command is inputted to the CPU 302 through the input/output interface 310 by a user operating an input unit 307, etc., the CPU 302 executes the program stored in the Read Only Memory (ROM) 303, according to the command. Alternatively, the CPU 302 loads and executes the program stored in the hard disk 305 into a Random Access Memory (RAM) 304.

As a consequence, the CPU 302 performs processes according to the above-described flowcharts or processes performed by the above-described block diagram configurations. Then, the CPU 302, for example, outputs the results of the processes from an output unit 306 through the input/output interface 310, or transmits the results of the processes from a communication unit 308, or furthermore records the results of processes in the hard disk 305, as necessary.

Note that the input unit 307 is constituted by a keyboard, a mouse, a microphone, etc. In addition, the output unit 306 is constituted by a Liquid Crystal Display (LCD), a speaker, etc.

Here, in the present specification, the processes performed by the computer according to program do not necessarily need to be performed in chronological order in the order described in the flowcharts. Namely, the processes performed by the computer according to the program also include processes performed in parallel or individually (e.g., parallel processing or object processing).

In addition, the program may be processed by a single computer (processor) or may be processed in a distributed manner by a plurality of computers. Furthermore, the program may be executed after been transferred to a remote computer.

Furthermore, in the present specification, the system refers to a set of a plurality of components (apparatuses, modules (parts), etc.), and it does not matter whether all components are included in a same casing. Therefore, a plurality of apparatuses that are contained in different casings and connected to each other through a network, and a single apparatus that contains a plurality of modules in one casing are both systems.

Note that an embodiment of the present technology is not limited to the one described above, and various changes may be made thereto without departing from the essence and scope of the present technology.

For example, the present technology can employ a configuration of cloud computing where one function is processed by a plurality of apparatuses by sharing and cooperation through a network.

In addition, each step described in the above-described flowcharts can be performed not only by a single apparatus, but also by a plurality of apparatuses in a shared manner.

Furthermore, when one step includes a plurality of processes, the plurality of processes included in the one step can be performed not only by a single apparatus, but also by a plurality of apparatuses in a shared manner.

In addition, for a target fragment from which portions are generated by the segmenter 22, (a part of data of) a fragment in any data format can be adopted in addition to a fragmented MP4 (ISO/IEC 14496-14) fragment.

Specifically, for a target fragment from which portions are generated, for example, fragments in ISO base media file format (ISO/IEC 14496-12), in a format specified in ISO/IEC 14496-15, in QuickTime format, or in other data formats having a so-called box structure, and furthermore, fragments where data in data formats that do not have a box structure (e.g., Transport Stream (TS), etc.) is fragmented can be adopted.

Furthermore, for a target fragment from which portions are generated, for example, fragments in MPEG Transport Stream (TS), in webM, or in any other moving image format can be adopted.

In addition, the present technology can be applied to delivery of any data other than content.

Here, the effects described in the present specification are merely exemplification and thus are not limited, and there may be other effects.

Note that the present technology can employ the following configurations.

<1>
A transmission apparatus including a delivering unit that delivers a Layered Coding Transport (LCT) packet including a portion and an LCT header, the portion being data including part of a fragment, wherein
the fragment includes:
a movie fragment (moof); and
a media data (mdat) including an mdat header and one or more sample groups,
the moof includes BaseMediaDecodeTime representing a presentation time of a first sample of the mdat, and
the LCT header includes:
a sequence number representing a position of the fragment;
a version representing a position of the part of the fragment in the fragment;
a Network Time Protocol (NTP) time corresponding to the BaseMediaDecodeTime;
sample count start information representing a position of a first sample of the part of the fragment from a first sample of the fragment; and
a moof subset that is at least part of the moof.
<2>
The transmission apparatus according to <1>, wherein the fragment is a fragmented MP4 fragment.

<3>
The transmission apparatus according to <2>, wherein
the portion is
a sample group serving as part of the fragment or
the moof and the mdat header that serve as part of the fragment.
<4>
The transmission apparatus according to <2>, wherein
the portion is a Hypertext Transfer Protocol (http) response, and
the http response includes
a sample group and the moof subset in a message body, the sample group being part of the fragment, and
the sequence number, the version, the NTP time, and the sample count start information in an http header.
<5>
The transmission apparatus according to any of <1> to <4>, wherein the moof subset is a portion of the moof that is generated until a sample group is generated, the sample group serving as part of the fragment.
<6>
A transmission method including a step of delivering a Layered Coding Transport (LCT) packet including a portion and an LCT header, the portion being data including part of a fragment, wherein
the fragment includes:
a movie fragment (moof); and
a media data (mdat) including an mdat header and a sample group,
the moof includes BaseMediaDecodeTime representing a presentation time of a first sample of the mdat, and
the LCT header includes:
a sequence number representing a position of the fragment;
a version representing a position of the part of the fragment in the fragment;
a Network Time Protocol (NTP) time corresponding to the BaseMediaDecodeTime;
sample count start information representing a position of a first sample of the part of the fragment from a first sample of the fragment; and
a moof subset that is at least part of the moof.
<7>
A program for causing a computer to function as a delivering unit that delivers a Layered Coding Transport (LCT) packet including a portion and an LCT header, the portion being data including part of a fragment, wherein
the fragment includes:
a movie fragment (moof); and
a media data (mdat) including an mdat header and a sample group,
the moof includes BaseMediaDecodeTime representing a presentation time of a first sample of the mdat, and
the LCT header includes:
a sequence number representing a position of the fragment;
a version representing a position of the part of the fragment in the fragment;
a Network Time Protocol (NTP) time corresponding to the BaseMediaDecodeTime;
sample count start information representing a position of a first sample of the part of the fragment from a first sample of the fragment; and
a moof subset that is at least part of the moof.
<8>
A reception apparatus including a receiving unit that receives a Layered Coding Transport (LCT) packet including a portion and an LCT header, the portion being data including part of a fragment, wherein
the fragment includes:
a movie fragment (moof); and
a media data (mdat) including an mdat header and a sample group,
the moof includes BaseMediaDecodeTime representing a presentation time of a first sample of the mdat, and
the LCT header includes:
a sequence number representing a position of the fragment;
a version representing a position of the part of the fragment in the fragment;
a Network Time Protocol (NTP) time corresponding to the BaseMediaDecodeTime;
sample count start information representing a position of a first sample of the part of the fragment from a first sample of the fragment; and
a moof subset that is at least part of the moof.
<9>
The reception apparatus according to <8>, wherein the fragment is a fragmented MP4 fragment.
<10>
The reception apparatus according to <9>, wherein
the portion is
a sample group serving as part of the fragment or
the moof and the mdat header that serve as part of the fragment.
<11>
The reception apparatus according to <9>, wherein
the portion is a Hypertext Transfer Protocol (http) response, and
the http response includes
a sample group and the moof subset in a message body, the sample group being part of the fragment, and
the sequence number, the version, the NTP time, and the sample count start information in an http header.
<12>
The reception apparatus according to any of <8> to <11>, wherein the moof subset is a portion of the moof that is generated until a sample group is generated, the sample group serving as part of the fragment.
<13>
A receiving method including a step of receiving a Layered Coding Transport (LCT) packet including a portion and an LCT header, the portion being data including part of a fragment, wherein
the fragment includes:
a movie fragment (moof); and
a media data (mdat) including an mdat header and a sample group,
the moof includes BaseMediaDecodeTime representing a presentation time of a first sample of the mdat, and
the LCT header includes:
a sequence number representing a position of the fragment;
a version representing a position of the part of the fragment in the fragment;
a Network Time Protocol (NTP) time corresponding to the BaseMediaDecodeTime;
sample count start information representing a position of a first sample of the part of the fragment from a first sample of the fragment; and
a moof subset that is at least part of the moof.
<14>
A program for causing a computer to function as a receiving unit that receives a Layered Coding Transport (LCT) packet including a portion and an LCT header, the portion being data including part of a fragment, wherein the fragment includes:
- a movie fragment (moof); and
- a media data (mdat) including an mdat header and a sample group, the moof includes BaseMediaDecodeTime representing a presentation time of a first sample of the mdat, and the LCT header includes:
- a sequence number representing a position of the fragment;
- a version representing a position of the part of the fragment in the fragment;
- a Network Time Protocol (NTP) time corresponding to the BaseMediaDecodeTime;
- sample count start information representing a position of a first sample of the part of the fragment from a first sample of the fragment; and
- a moof subset that is at least part of the moof.

REFERENCE SYMBOLS LIST

10 Network
11 Delivery server
12 Client
13 NTP server
21 Channel streamer
22 Segmenter
23 Metadata generator
24 FLUTE streamer
25 Multicast server
26 Web server
30 Receiving unit
31 Middleware
32 DASH client
33 Reproducing unit
301 Bus
302 CPU
303 ROM
304 RAM
305 Hard disk
306 Output unit
307 Input unit
308 Communication unit
309 Drive
310 Input/output interface
311 Removable recording medium

The invention claimed is:

1. A transmission method comprising a step of delivering a Layered Coding Transport (LCT) packet including a portion and an LCT header, the portion being data including part of a fragment, wherein the fragment includes:
- a movie fragment (moof); and
- a media data (mdat) including an mdat header and a sample group, the moof includes BaseMediaDecodeTime representing a presentation time of a first sample of the mdat, and the LCT header includes:
- a sequence number representing a position of the fragment;
- a version representing a position of the part of the fragment in the fragment;
- a header extension portion including a Network Time Protocol (NTP) time representing the presentation time of the first sample of the mdat;
- sample count start information representing a position of a first sample of the part of the fragment from a first sample of the fragment; and
- a moof subset that is at least part of the moof.

2. A transmission apparatus comprising a transmitter that delivers a Layered Coding Transport (LCT) packet including a portion and an LCT header, the portion being data including part of a fragment, wherein the fragment includes:
- a movie fragment (moof); and
- a media data (mdat) including an mdat header and one or more sample groups, the moof includes BaseMediaDecodeTime representing a presentation time of a first sample of the mdat, and the LCT header includes:
- a sequence number representing a position of the fragment;
- a version representing a position of the part of the fragment in the fragment;
- a header extension portion including a Network Time Protocol (NTP) time representing the presentation time of the first sample of the mdat;
- sample count start information representing a position of a first sample of the part of the fragment from a first sample of the fragment; and
- a moof subset that is at least part of the moof.

3. The transmission apparatus according to claim 2, wherein the fragment is a fragmented MP4 fragment.

4. The transmission apparatus according to claim 3, wherein the portion is
- a sample group serving as part of the fragment or
- the moof and the mdat header that serve as part of the fragment.

5. The transmission apparatus according to claim 3, wherein
- the portion is a Hypertext Transfer Protocol (http) response, and
- the http response includes
  - a sample group and the moof subset in a message body, the sample group being part of the fragment, and
  - the sequence number, the version, the NTP time, and the sample count start information in an http header.

6. The transmission apparatus according to claim 3, wherein the moof subset is a portion of the moof that is generated until a sample group is generated, the sample group serving as part of the fragment.

7. The transmission apparatus according to claim 2, wherein the moof further includes a track fragment run (trun) that stores information for computing a presentation time of each of a plurality of samples of the mdat.

8. A non-transitory computer-readable storage medium storing computer-readable instructions thereon, which, when executed by a computer, cause the computer to function as a transmitter that delivers a Layered Coding Transport (LCT) packet including a portion and an LCT header, the portion being data including part of a fragment, wherein the fragment includes:
- a movie fragment (moof); and
- a media data (mdat) including an mdat header and a sample group, the moof includes BaseMediaDecodeTime representing a presentation time of a first sample of the mdat, and the LCT header includes:
- a sequence number representing a position of the fragment;
- a version representing a position of the part of the fragment in the fragment;

a header extension portion including a Network Time Protocol (NTP) time representing the presentation time of the first sample of the mdat;
sample count start information representing a position of a first sample of the part of the fragment from a first sample of the fragment; and
a moof subset that is at least part of the moof.

9. A reception apparatus comprising a receiver that receives a Layered Coding Transport (LCT) packet including a portion and an LCT header, the portion being data including part of a fragment, wherein
the fragment includes:
   a movie fragment (moof); and
   a media data (mdat) including an mdat header and a sample group,
the moof includes BaseMediaDecodeTime representing a presentation time of a first sample of the mdat, and
the LCT header includes:
   a sequence number representing a position of the fragment;
   a version representing a position of the part of the fragment in the fragment;
   a header extension portion including a Network Time Protocol (NTP) time representing the presentation time of the first sample of the mdat;
   sample count start information representing a position of a first sample of the part of the fragment from a first sample of the fragment; and
   a moof subset that is at least part of the moof.

10. The reception apparatus according to claim 9, wherein the fragment is a fragmented MP4 fragment.

11. The reception apparatus according to claim 10, wherein
the portion is
   a sample group serving as part of the fragment or
   the moof and the mdat header that serve as part of the fragment.

12. The reception apparatus according to claim 10, wherein
the portion is a Hypertext Transfer Protocol (http) response, and
the http response includes
   a sample group and the moof subset in a message body, the sample group being part of the fragment, and
   the sequence number, the version, the NTP time, and the sample count start information in an http header.

13. The reception apparatus according to claim 10, wherein the moof subset is a portion of the moof generated until a sample group is generated, the sample group serving as part of the fragment.

14. A receiving method comprising a step of receiving a Layered Coding Transport (LCT) packet including a portion and an LCT header, the portion being data including part of a fragment, wherein
the fragment includes:
   a movie fragment (moof); and
   a media data (mdat) including an mdat header and a sample group,
the moof includes BaseMediaDecodeTime representing a presentation time of a first sample of the mdat, and
the LCT header includes:
   a sequence number representing a position of the fragment;
   a version representing a position of the part of the fragment in the fragment;
   a header extension portion including a Network Time Protocol (NTP) time representing the presentation time of the first sample of the mdat;
   sample count start information representing a position of a first sample of the part of the fragment from a first sample of the fragment; and
   a moof subset that is at least part of the moof.

15. The receiving method according to claim 14, wherein the fragment is a fragmentedMP4 fragment.

16. The receiving method according to claim 15, wherein the portion is a sample group serving as part of the fragment or the moof and the mdat header that serve as part of the fragment.

17. The receiving method according to claim 15, wherein the portion is a Hypertext Transfer Protocol (http) response, and the http response includes a sample group and the moof subset in a message body, the sample group being part of the fragment, and the sequence number, the version, the NTP time, and the sample count start information in an http header.

18. The receiving method according to claim 15, wherein the moof subset is a portion of the moof generated until a sample group is generated, the sample group serving as part of the fragment.

19. A non-transitory computer-readable storage medium storing computer-readable instructions thereon, which, when executed by a computer, cause the computer to function as a receiver that receives a Layered Coding Transport (LCT) packet including a portion and an LCT header, the portion being data including part of a fragment, wherein
the fragment includes:
   a movie fragment (moof); and
   a media data (mdat) including an mdat header and a sample group,
the moof includes BaseMediaDecodeTime representing a presentation time of a first sample of the mdat, and
the LCT header includes:
   a sequence number representing a position of the fragment;
   a version representing a position of the part of the fragment in the fragment;
   a header extension portion including a Network Time Protocol (NTP) time representing the presentation time of the first sample of the mdat;
   sample count start information representing a position of a first sample of the part of the fragment from a first sample of the fragment; and
   a moof subset that is at least part of the moof.

* * * * *